(12) United States Patent
Lin

(10) Patent No.: US 11,340,607 B2
(45) Date of Patent: May 24, 2022

(54) VEHICLE EXTERNAL COMMUNICATION METHOD AND APPARATUS, AND TERMINAL

(71) Applicant: Huawei Technologies Co., Ltd., Shenzhen (CN)

(72) Inventor: Yangbo Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 739 days.

(21) Appl. No.: 16/244,513

(22) Filed: Jan. 10, 2019

(65) Prior Publication Data

US 2019/0146484 A1 May 16, 2019

Related U.S. Application Data

(63) Continuation of application No. PCT/CN2016/089748, filed on Jul. 12, 2016.

(51) Int. Cl.
*G05D 1/00* (2006.01)
*H04L 67/125* (2022.01)
(Continued)

(52) U.S. Cl.
CPC ........... *G05D 1/0022* (2013.01); *G07C 5/008* (2013.01); *H04L 29/12* (2013.01); *H04L 63/10* (2013.01);
(Continued)

(58) Field of Classification Search
CPC ......... G05D 1/0022; G05D 2201/0213; G07C 5/008; H04L 29/12; H04L 63/10;
(Continued)

(56) References Cited

U.S. PATENT DOCUMENTS

2006/0193282 A1* 8/2006 Ikawa .................. H04L 69/329
370/428
2009/0012675 A1* 1/2009 Laghrari ................ G07C 5/008
701/31.4
(Continued)

FOREIGN PATENT DOCUMENTS

CN 101340462 A 1/2009
CN 102263831 A 11/2011
(Continued)

OTHER PUBLICATIONS

Foreign Communication From A Counterpart Application, European Application No. 16908414.2, Partial Supplementary European Search Report dated Jun. 4, 2019, 13 pages.
(Continued)

*Primary Examiner* — Muhammad Shafi
(74) *Attorney, Agent, or Firm* — Conley Rose, P.C.

(57) ABSTRACT

A vehicle external communication method and apparatus and a terminal, where the method includes sending, by a vehicle, an association registration request message to a management device, where the association registration request message indicating that the vehicle requests to establish a control association with the management device, and receiving, by the vehicle, a first association registration response message from the management device including a success identifier, or receiving, by the vehicle, a second association registration response message from the management device including a failure identifier.

20 Claims, 11 Drawing Sheets

(51) Int. Cl.
*H04W 12/06* (2021.01)
*H04L 67/141* (2022.01)
*H04L 61/00* (2022.01)
*H04W 12/08* (2021.01)
*H04W 4/44* (2018.01)
*H04L 29/06* (2006.01)
*H04W 76/11* (2018.01)
*H04W 4/40* (2018.01)
*G07C 5/00* (2006.01)
*H04W 60/04* (2009.01)
*H04W 60/06* (2009.01)

(52) U.S. Cl.
CPC .......... *H04L 67/125* (2013.01); *H04L 67/141* (2013.01); *H04W 4/40* (2018.02); *H04W 4/44* (2018.02); *H04W 12/06* (2013.01); *H04W 12/08* (2013.01); *H04W 60/04* (2013.01); *H04W 60/06* (2013.01); *H04W 76/11* (2018.02); *G05D 2201/0213* (2013.01)

(58) Field of Classification Search
CPC ..... H04L 67/125; H04L 67/141; H04L 67/16; H04L 67/12; H04W 4/40; H04W 4/44; H04W 12/06; H04W 12/08; H04W 60/04; H04W 60/06; H04W 76/11
USPC ............................................................ 701/2
See application file for complete search history.

(56) References Cited

U.S. PATENT DOCUMENTS

| | | | |
|---|---|---|---|
| 2011/0053552 A1* | 3/2011 | Kim ....................... | G08G 1/005 455/456.2 |
| 2013/0346563 A1 | 12/2013 | Huang | |
| 2014/0172229 A1* | 6/2014 | Rude ...................... | G07C 5/008 726/4 |
| 2015/0363986 A1* | 12/2015 | Hoyos ................. | H04L 63/0861 340/5.61 |
| 2016/0128016 A1 | 5/2016 | Avary et al. | |
| 2016/0198002 A1 | 7/2016 | Penilla et al. | |

FOREIGN PATENT DOCUMENTS

| | | |
|---|---|---|
| CN | 103342119 A | 10/2013 |
| JP | 2002123891 A | 4/2002 |
| JP | 2002271258 A | 9/2002 |
| JP | 2003044962 A | 2/2003 |
| JP | 2004038775 A | 2/2004 |
| JP | 2004140554 A | 5/2004 |
| JP | 2007151182 A | 6/2007 |
| JP | 2013156071 A | 8/2013 |
| JP | 2013156943 A | 8/2013 |
| KR | 20110024979 A | 3/2011 |
| KR | 20120055832 A | 6/2012 |
| KR | 20140134726 A | 11/2014 |

OTHER PUBLICATIONS

Wedel, J., et al., V2X-Based Traffic Congestion Recognition and Avoidance, 10th International Symposium on Pervasive Systems, Algorithms, and Networks, 2009, pp. 637-641.
Machine Translation and Abstract of Chinese Publication No. CN102263831, Nov. 30, 2011, 14 pages.
Machine Translation and Abstract of Chinese Publication No. CN103342119, Oct. 9, 2013, 15 pages.
China Intelligent, "Cooperative intelligent transportation system Enhanced application set," V0.1, T/ITS 0098, 2017, 45 pages.
Partial English Translation of China Intelligent, "Cooperative intelligent transportation system Enhanced application set," V0.1, T/ITS 0098, 2017, 3 pages.
Foreign Communication From A Counterpart Application, PCT Application No. PCT/CN2016/089748, English Translation of International Search Report dated Apr. 10, 2017, 2 pages.
Foreign Communication From A Counterpart Application, PCT Application No. PCT/CN2016/089748, English Translation of Written Opinion dated Apr. 11, 2017, 3 pages.

* cited by examiner

VEHICLE EXTERNAL COMMUNICATION METHOD AND APPARATUS, AND TERMINAL

CROSS-REFERENCE TO RELATED APPLICATIONS

This application is a continuation of International Patent Application No. PCT/CN2016/089748 filed on Jul. 12, 2016, which is hereby incorporated by reference in its entirety.

TECHNICAL FIELD

This application relates to the field of transportation system technologies, and in particular, to a vehicle external communication method and apparatus and a terminal that are applied to a transportation system.

BACKGROUND

An Intelligent Transportation System (ITS) integrates and applies advanced technologies such as an information technology, a communications technology, a sensing technology, a control technology, and a computer technology in order to establish a real-time, accurate, efficient, and comprehensive transportation management system that plays an all-round role in a wide range. Main traffic participants in the ITS include a road infrastructure, a vehicle, a user, a management center, and the like. Vehicles are scheduled by the management center together such that traffic facilities can be effectively used, traffic load and environmental pollution can be reduced, traffic safety can be ensured, and transportation efficiency can be improved, and these are a future development direction of the transportation system.

In a conventional transportation system, a vehicle usually does not exchange information with another traffic participant, and therefore, a user can control, depending on only vehicle information of the user, the vehicle to participate in a road traffic activity. Consequently, poor vehicle safety and passing efficiency are caused. For example, when the user drives the vehicle to pass an intersection, because the user cannot learn, in advance, information about an oncoming vehicle in an opposite direction, the user cannot control the vehicle to effectively give way to the oncoming vehicle, and consequently, a traffic accident may be caused. When the user drives the vehicle at rush hour, because the user cannot learn, in advance, congestion information of a road section ahead, the user cannot change a corresponding travelling policy in time, and consequently, a schedule may be delayed.

In the ITS, to improve vehicle safety and passing efficiency, the vehicle needs to frequently interact with another traffic participant. For example, a vehicle applies to the management center for a drive in a self-driving mode to an area. A vehicle obtains traffic control information of a road section ahead from a road-side infrastructure. A vehicle notifies a surrounding vehicle of a travelling direction and speed of the vehicle to avoid vehicle collision. A vehicle requests a path planning service and the like from the management center. A process of interaction between the vehicle and the other traffic participant in the ITS includes collection, processing, and exchange of a large amount of information of the vehicle, for example, static vehicle information such as a vehicle model, load, or emission of the vehicle, dynamic vehicle information such as a direction, a speed, or braking of the vehicle, or human constraint information such as a requirement, a habit, or a preference of a vehicle driver or passenger.

Therefore, how the vehicle and the other traffic participant perform control and interaction based on vehicle information is a most basic and important operating mechanism of the ITS, and is also an important factor affecting vehicle safety and passing efficiency. Because control and interaction of the vehicle and the other traffic participant are implemented using a communication message in the ITS, it is needed to establish a set of ITS communication solutions, to improve vehicle safety and passing efficiency.

SUMMARY

This application provides a vehicle external communication method and apparatus and a terminal, to improve vehicle safety and passing efficiency.

According to a first aspect, this application provides a vehicle external communication method, applied to a vehicle in a transportation system, where the method includes sending, by the vehicle, an association registration request message to a management device, where the association registration request message is used to indicate that the vehicle requests to establish a control association with the management device, and the control association includes one of the following the vehicle sends an application request message to the management device and receives an application response message that is sent by the management device according to the application request message, the vehicle receives an application request message sent by the management device and sends an application response message to the management device according to the application request message, the vehicle sends a notification message to the management device, or the vehicle receives a notification message sent by the management device, and receiving, by the vehicle, a first association registration response message that is sent by the management device and that includes a success identifier, and establishing control association with the management device according to the first association registration response message, where the first association registration response message is used to indicate that the vehicle is allowed to establish control association with the management device, or receiving, by the vehicle, a second association registration response message that is sent by the management device and that includes a failure identifier, where the second association registration response message is used to indicate that the vehicle is forbidden to establish control association with the management device.

In this implementation, the control association between the vehicle and the management device is used as a precondition for participation of the vehicle in a road traffic activity such that all vehicles participating in the road traffic activity can be scheduled and controlled by the management device together, and vehicle safety and passing efficiency can be improved.

With reference to the first aspect, in a first possible implementation of the first aspect, that the vehicle sends an application request message to the management device and receives an application response message that is sent by the management device according to the application request message includes sending, by the vehicle, an association deregistration request message to the management device, where the association deregistration request message is used to indicate that the vehicle requests to cancel control association with the management device, and receiving, by the vehicle, a first association deregistration response message that is sent by the management device and that includes a success identifier, and canceling control association with the management device according to the first association deregistration response message, where the first association deregistration response message is used to indicate that the vehicle is allowed to cancel control association with the management device, or receiving, by the vehicle, a second association deregistration response message that is sent by the management device and that includes a failure identifier, where the second association deregistration response message is used to indicate that the vehicle is forbidden to cancel control association with the management device.

In this implementation, the management device can dynamically manage the vehicle in the transportation system by controlling the vehicle to join or exit the transportation system. Therefore, not only resource utilization is improved, but a dynamically changing requirement of the vehicle in the transportation system is also satisfied.

With reference to the first aspect, in a second possible implementation of the first aspect, that the vehicle sends an application request message to the management device and receives an application response message that is sent by the management device according to the application request message includes sending, by the vehicle, a user update request message including a user identifier to the management device, where the user update request message is used to indicate that a user corresponding to the user identifier requests to use the vehicle, and receiving, by the vehicle, a first user update response message that is sent by the management device and that includes a success identifier, where the first user update response message is used to indicate that the management device allows the user corresponding to the user identifier to use the vehicle, or receiving, by the vehicle, a second user update response message that is sent by the management device and that includes a failure identifier, where the second user update response message is used to indicate that the management device forbids the user corresponding to the user identifier to use the vehicle.

In this implementation, vehicle safety in the transportation system can also be ensured while a vehicle user update requirement is satisfied.

With reference to the first aspect, in a third possible implementation of the first aspect, that the vehicle receives a notification message sent by the management device includes receiving, by the vehicle, a user update message that is sent by the management device and that includes a user identifier, where the user update message is used to indicate that a user corresponding to the user identifier is allowed to use the vehicle.

In this implementation, the management device can actively update vehicle user information to dynamically manage a vehicle user.

With reference to the first aspect, in a fourth possible implementation of the first aspect, that the vehicle receives an application request message sent by the management device and sends an application response message to the management device according to the application request message includes receiving, by the vehicle, a query request message that is sent by the management device and that includes a vehicle parameter identifier, and sending, by the vehicle, a query response message to the management device, where the query response message includes a vehicle parameter corresponding to the vehicle parameter identifier.

In this implementation, the management device can query corresponding vehicle information according to a requirement to perform corresponding function control on the vehicle according to the vehicle information or provide a corresponding service for the vehicle according to the vehicle information.

With reference to the first aspect, in a fifth possible implementation of the first aspect, that the vehicle sends a notification message to the management device includes sending, by the vehicle to the management device, a notification message including a vehicle parameter corresponding to a vehicle parameter identifier, where the notification message is used to instruct to synchronize the vehicle parameter corresponding to the vehicle parameter identifier to the management device.

In this implementation, the vehicle can actively send a notification message to another traffic participant to synchronize vehicle information of the vehicle to the other traffic participant.

With reference to the fifth possible implementation of the first aspect, in a sixth possible implementation of the first aspect, sending, by the vehicle to the management device, a notification message including a vehicle parameter corresponding to a vehicle parameter identifier includes sending, by the vehicle, a first vehicle status notification message to the management device, where the first vehicle status notification message includes a status parameter of a common part of the vehicle, or sending, by the vehicle, a second vehicle status notification message to the management device, where the second vehicle status notification message includes a status parameter of an alarm part or a faulty part of the vehicle.

In this implementation, the vehicle can notify, in time, the management device of the status parameter of the common part and the status parameter of the alarmed part or a faulty part of the vehicle such that the management device correspondingly controls and manages the vehicle according to status parameter information, and vehicle safety is improved.

With reference to the fifth possible implementation of the first aspect, in a seventh possible implementation of the first aspect, sending, by the vehicle to the management device, a notification message including a vehicle parameter corresponding to a vehicle parameter identifier includes sending, by the vehicle, a road resource use notification message to the management device, where the road resource use notification message includes a parameter of a road that has been used by the vehicle.

In this implementation, the vehicle can notify another traffic participant of information about a road that has been used by the vehicle such that the road that has been used is used by the other traffic participant in time, and road resource utilization is improved.

With reference to any one of the fourth to the seventh possible implementations of the first aspect, in an eighth possible implementation of the first aspect, the vehicle parameter identifier includes at least one of a vehicle item identifier and a vehicle subitem identifier, and a vehicle parameter corresponding to the vehicle item identifier includes a vehicle parameter corresponding to the vehicle subitem identifier.

In this implementation, because not all vehicle information is necessarily needed in a service interaction process, when the vehicle parameter is organized using the vehicle item identifier and the vehicle subitem identifier, communication resource waste can be avoided, and communication efficiency can be improved.

With reference to the first aspect, in a ninth possible implementation of the first aspect, that the vehicle sends an application request message to the management device and receives an application response message that is sent by the management device according to the application request message includes sending, by the vehicle, a road resource allocation request message including road constraint information to the management device, where the road resource allocation request message is used to indicate that the vehicle requests the management device to allocate a road resource to the vehicle according to the road constraint information, and receiving, by the vehicle, a first road resource allocation response message that is sent by the management device and that includes a success identifier and road resource allocation information, where the first road resource allocation response message is used to indicate that the management device succeeds in allocating the road resource to the vehicle such that the vehicle obtains the road resource allocation information, or receiving, by the vehicle, a second road resource allocation response message that is sent by the management device and that includes a failure identifier, where the second road resource allocation response message is used to indicate that the management device fails to allocate the road resource to the vehicle.

In this implementation, the management device can properly allocate the road resource to the vehicle based on a vehicle requirement to improve road resource utilization in the transportation system and improve passing efficiency of the vehicle.

With reference to the ninth possible implementation of the first aspect, in a tenth possible implementation of the first aspect, after the vehicle obtains the road resource allocation information, the method further includes sending, by the vehicle, a road resource release message to the management device, where the road resource release message is used to instruct the management device to release a road that is not used in the road resource allocation information.

In this implementation, the vehicle can release, in time, a road resource that the vehicle does not need to improve road resource utilization.

With reference to the first aspect, in an eleventh possible implementation of the first aspect, the sending, by the vehicle, an association registration request message to a management device includes obtaining, by the vehicle, management device identity information, and sending, by the vehicle, the association registration request message to a management device corresponding to the management device identity information.

In this implementation, when there are multiple management devices in the transportation system, the vehicle can determine, according to the management device identity information, the management device with which the vehicle can establish the control association.

With reference to the first aspect, in a twelfth possible implementation of the first aspect, the sending, by the vehicle, an association registration request message to a management device, where the association registration request message is used to indicate that the vehicle requests to establish a control association with the management device includes sending, by the vehicle, an association registration request message including vehicle identity information to the management device, where the association registration request message is used to indicate that a vehicle corresponding to the vehicle identity information requests to establish a control association with the management device.

In this implementation, the vehicle identity information is used as a unique identity of the vehicle in the transportation system such that the management device determines the vehicle that is in the transportation system and that sends an application request.

According to a second aspect, this application provides a vehicle external communication method, applied to a management device in a transportation system, where the method includes receiving, by the management device, an association registration request message sent by a vehicle, where the association registration request message is used to indicate that the vehicle requests to establish a control association with the management device, and the control association includes one of the following, where the management device receives an application request message sent by the vehicle and sends an application response message to the vehicle according to the application request message, the management device sends an application request message to the vehicle and receives an application response message that is sent by the vehicle according to the application request message, the management device receives a notification message sent by the vehicle, or the management device sends a notification message to the vehicle, and sending, by the management device, a first association registration response message including a success identifier to the vehicle such that the vehicle establishes control association with the management device according to the first association registration response message, where the first association registration response message is used to indicate that the vehicle is allowed to establish control association with the management device, or sending, by the management device, a second association registration response message including a failure identifier to the vehicle, where the second association registration response message is used to indicate that the vehicle is forbidden to establish control association with the management device.

With reference to the second aspect, in a first possible implementation of the second aspect, that the management device receives an application request message sent by the vehicle and sends an application response message to the vehicle according to the application request message includes receiving, by the management device, an association deregistration request message sent by the vehicle, where the association deregistration request message is used to indicate that the vehicle requests to cancel control association with the management device, and sending, by the management device, a first association deregistration response message including a success identifier to the vehicle such that the vehicle cancels control association with the management device according to the first association deregistration response message, where the first association deregistration response message is used to indicate that the vehicle is allowed to cancel control association with the management device, or sending, by the management device, a second association deregistration response message including a failure identifier to the vehicle, where the second association deregistration response message is used to indicate that the vehicle is forbidden to cancel control association with the management device.

With reference to the second aspect, in a second possible implementation of the second aspect, that the management device receives an application request message sent by the vehicle and sends an application response message to the vehicle according to the application request message includes receiving, by the management device, a user update request message that is sent by the vehicle and that includes a user identifier, where the user update request message is used to indicate that a user corresponding to the user identifier requests to use the vehicle, and sending, by the management device, a first user update response message including a success identifier to the vehicle, where the first user update response message is used to indicate that the management device allows the user corresponding to the user identifier to use the vehicle, or sending, by the management device, a second user update response message including a failure identifier to the vehicle, where the second user update response message is used to indicate that the management device forbids the user corresponding to the user identifier to use the vehicle.

With reference to the second aspect, in a third possible implementation of the second aspect, that the management device sends a notification message to the vehicle includes sending, by the management device, a user update message including a user identifier to the vehicle, where the user update message is used to indicate that a user corresponding to the user identifier is allowed to use the vehicle.

With reference to the second aspect, in a fourth possible implementation of the second aspect, that the management device sends an application request message to the vehicle and receives an application response message that is sent by the vehicle according to the application request message includes sending, by the management device, a query request message to the vehicle, and receiving, by the management device, a query response message sent by the vehicle, where the query response message includes a vehicle parameter corresponding to a vehicle parameter identifier.

With reference to the second aspect, in a fifth possible implementation of the second aspect, that the management device sends a notification message to the vehicle includes receiving, by the management device, a notification message that is sent by the vehicle and that includes a vehicle parameter corresponding to a vehicle parameter identifier, where the notification message is used to instruct to synchronize the vehicle parameter corresponding to the vehicle parameter identifier to the management device.

With reference to the fifth possible implementation of the second aspect, in a sixth possible implementation of the second aspect, the receiving, by the management device, a notification message that is sent by the vehicle and that includes a vehicle parameter corresponding to a vehicle parameter identifier includes receiving, by the management device, a first vehicle status notification message sent by the vehicle, where the first vehicle status notification message includes a status parameter of a common part of the vehicle, or receiving, by the management device, a second vehicle status notification message sent by the vehicle, where the second vehicle status notification message includes a status parameter of an alarm part or a faulty part of the vehicle.

With reference to the fifth possible implementation of the second aspect, in a seventh possible implementation of the second aspect, the receiving, by the management device, a notification message that is sent by the vehicle and that includes a vehicle parameter corresponding to a vehicle parameter identifier includes receiving, by the management device, a road resource use notification message sent by the vehicle, where the road resource use notification message includes a parameter of a road that has been used by the vehicle.

With reference to the second aspect, in an eighth possible implementation of the second aspect, that the management device receives an application request message sent by the vehicle and sends an application response message to the vehicle according to the application request message includes receiving, by the management device, a road resource allocation request message that is sent by the vehicle and that includes road constraint information, where the road resource allocation request message is used to indicate that the vehicle requests the management device to allocate a road resource to the vehicle according to the road constraint information, and sending, by the management device, a first road resource allocation response message including a success identifier and road resource allocation information to the vehicle, where the first road resource allocation response message is used to indicate that the management device succeeds in allocating the road resource to the vehicle such that the vehicle obtains the road resource allocation information, or sending, by the management device, a second road resource allocation response message including a failure identifier to the vehicle, where the second road resource allocation response message is used to indicate that the management device fails to allocate the road resource to the vehicle.

With reference to the second aspect, in a ninth possible implementation of the second aspect, after the vehicle obtains the road resource allocation information, the method further includes receiving, by the management device, a road resource release message sent by the vehicle, where the road resource release message is used to instruct the management device to release a road that is not used in the road resource allocation information.

According to a third aspect, this application further provides a vehicle external communication apparatus, applied to a vehicle in a transportation system, where the apparatus includes an association registration request message sending module configured to send an association registration request message to a management device, where the association registration request message is used to indicate that the vehicle requests to establish a control association with the management device using a control association module, and the control association includes one of the following, where the vehicle sends an application request message to the management device and receives an application response message that is sent by the management device according to the application request message, the vehicle receives an application request message sent by the management device and sends an application response message to the management device according to the application request message, the vehicle sends a notification message to the management device, or the vehicle receives a notification message sent by the management device, and a first association registration response message receiving module configured to receive a first association registration response message that is sent by the management device and that includes a success identifier, and establish control association with the management device according to the first association registration response message, where the first association registration response message is used to indicate that the vehicle is allowed to establish control association with the management device, or a second association registration response message receiving module configured to receive a second association registration response message that is sent by the management device and that includes a failure identifier, where the second association registration response message is used to indicate that the vehicle is forbidden to establish control association with the management device.

With reference to the third aspect, in a first possible implementation of the third aspect, the control association module includes an association deregistration request message sending submodule configured to send an association deregistration request message to the management device, where the association deregistration request message is used to indicate that the vehicle requests to cancel control association with the management device, and a first association deregistration response message receiving submodule configured to receive a first association deregistration response message that is sent by the management device and that includes a success identifier, and cancel control association with the management device according to the first association deregistration response message, where the first association deregistration response message is used to indicate that the vehicle is allowed to cancel control association with the management device, or a second association deregistration response message receiving submodule configured to receive a second association deregistration response message that is sent by the management device and that includes a failure identifier, where the second association deregistration response message is used to indicate that the vehicle is forbidden to cancel control association with the management device.

With reference to the third aspect, in a second possible implementation of the third aspect, the control association module includes a user update request message sending submodule configured to send a user update request message including a user identifier to the management device, where the user update request message is used to indicate that a user corresponding to the user identifier requests to use the vehicle, and a first user update response message receiving submodule configured to receive a first user update response message that is sent by the management device and that includes a success identifier, where the first user update response message is used to indicate that the management device allows the user corresponding to the user identifier to use the vehicle, or a second user update response message receiving submodule configured to receive a second user update response message that is sent by the management device and that includes a failure identifier, where the second user update response message is used to indicate that the management device forbids the user corresponding to the user identifier to use the vehicle.

With reference to the third aspect, in a third possible implementation of the third aspect, the control association module includes a user update message receiving submodule configured to receive a user update message that is sent by the management device and that includes a user identifier, where the user update message is used to indicate that a user corresponding to the user identifier is allowed to use the vehicle.

With reference to the third aspect, in a fourth possible implementation of the third aspect, the control association module includes a query request message receiving submodule configured to receive a query request message that is sent by the management device and that includes a vehicle parameter identifier, and a query response message sending submodule configured to send a query response message to the management device, where the query response message includes a vehicle parameter corresponding to the vehicle parameter identifier.

With reference to the third aspect, in a fifth possible implementation of the third aspect, the control association module includes a notification message sending submodule configured to send, to the management device, a notification message including a vehicle parameter corresponding to a vehicle parameter identifier, where the notification message is used to instruct to synchronize the vehicle parameter corresponding to the vehicle parameter identifier to the management device.

With reference to the fifth possible implementation of the third aspect, in a sixth possible implementation of the third aspect, the notification message sending submodule includes a first vehicle status notification message sending submodule configured to send a first vehicle status notification message to the management device, where the first vehicle status notification message includes a status parameter of a common part of the vehicle, or a second vehicle status notification message sending submodule configured to send a second vehicle status notification message to the management device, where the second vehicle status notification message includes a status parameter of an alarm part or a faulty part of the vehicle.

With reference to the fifth possible implementation of the third aspect, in a seventh possible implementation of the third aspect, the notification message sending submodule includes a road resource use notification message sending submodule configured to send a road resource use notification message to the management device, where the road resource use notification message includes a parameter of a road that has been used by the vehicle.

With reference to the third aspect, in an eighth possible implementation of the third aspect, the control association module includes a road resource allocation request message sending submodule configured to send a road resource allocation request message including road constraint information to the management device, where the road resource allocation request message is used to indicate that the vehicle requests the management device to allocate a road resource to the vehicle according to the road constraint information, and a first road resource allocation response message receiving submodule configured to receive a first road resource allocation response message that is sent by the management device and that includes a success identifier and road resource allocation information, where the first road resource allocation response message is used to indicate that the management device succeeds in allocating the road resource to the vehicle such that the vehicle obtains the road resource allocation information, or a second road resource allocation response message receiving submodule configured to receive a second road resource allocation response message that is sent by the management device and that includes a failure identifier, where the second road resource allocation response message is used to indicate that the management device fails to allocate the road resource to the vehicle.

With reference to the eighth possible implementation of the third aspect, in a ninth possible implementation of the third aspect, the control association module further includes a road resource release message sending submodule configured to send a road resource release message to the management device, where the road resource release message is used to instruct the management device to release a road that is not used in the road resource allocation information.

With reference to the third aspect, in a tenth possible implementation of the third aspect, the association registration request message sending module includes a management device identity information obtaining submodule configured to obtain management device identity information, and an association registration request message sending submodule configured to send the association registration request message to a management device corresponding to the management device identity information.

According to a fourth aspect, this application provides a vehicle external communication apparatus, applied to a management device in a transportation system, where the apparatus includes an association registration request message receiving module configured to receive an association registration request message sent by a vehicle, where the association registration request message is used to indicate that the vehicle requests to establish a control association with the management device using a control association module, and the control association includes one of the following, where the management device receives an application request message sent by the vehicle and sends an application response message to the vehicle according to the application request message, the management device sends an application request message to the vehicle and receives an application response message that is sent by the vehicle according to the application request message, the management device receives a notification message sent by the vehicle, or the management device sends a notification message to the vehicle, and a first association registration response message sending module configured to send a first association registration response message including a success identifier to the vehicle such that the vehicle establishes control association with the management device according to the first association registration response message, where the first association registration response message is used to indicate that the vehicle is allowed to establish control association with the management device, or a second association registration response message sending module configured to send a second association registration response message including a failure identifier to the vehicle, where the second association registration response message is used to indicate that the vehicle is forbidden to establish control association with the management device.

With reference to the fourth aspect, in a first possible implementation of the fourth aspect, the control association module includes an association deregistration request message receiving submodule configured to receive an association deregistration request message sent by the vehicle, where the association deregistration request message is used to indicate that the vehicle requests to cancel control association with the management device, and a first association deregistration response message sending submodule configured to send a first association deregistration response message including a success identifier to the vehicle such that the vehicle cancels control association with the management device according to the first association deregistration response message, where the first association deregistration response message is used to indicate that the vehicle is allowed to cancel control association with the management device, or a second association deregistration response message sending submodule configured to send a second association deregistration response message including a failure identifier to the vehicle, where the second association deregistration response message is used to indicate that the vehicle is forbidden to cancel control association with the management device.

With reference to the fourth aspect, in a second possible implementation of the fourth aspect, the control association module includes a user update request message receiving submodule configured to receive a user update request message that is sent by the vehicle and that includes a user identifier, where the user update request message is used to indicate that a user corresponding to the user identifier requests to use the vehicle, and a first user update response message sending submodule configured to send a first user update response message including a success identifier to the vehicle, where the first user update response message is used to indicate that the management device allows the user corresponding to the user identifier to use the vehicle, or a second user update response message sending submodule configured to send a second user update response message including a failure identifier to the vehicle, where the second user update response message is used to indicate that the management device forbids the user corresponding to the user identifier to use the vehicle.

With reference to the fourth aspect, in a third possible implementation of the fourth aspect, the control association module includes a user update message sending submodule configured to send a user update message including a user identifier to the vehicle, where the user update message is used to indicate that a user corresponding to the user identifier is allowed to use the vehicle.

With reference to the fourth aspect, in a fourth possible implementation of the fourth aspect, the control association module includes a query request message sending submodule configured to send a query request message to the vehicle, and a query response message receiving submodule configured to receive a query response message sent by the vehicle, where the query response message includes a vehicle parameter corresponding to a vehicle parameter identifier.

With reference to the fourth aspect, in a fifth possible implementation of the fourth aspect, the control association module includes a notification message receiving submodule configured to receive a notification message that is sent by the vehicle and that includes a vehicle parameter corresponding to a vehicle parameter identifier, where the notification message is used to instruct to synchronize the vehicle parameter corresponding to the vehicle parameter identifier to the management device.

With reference to the fifth possible implementation of the fourth aspect, in a sixth possible implementation of the fourth aspect, the notification message receiving submodule includes a first vehicle status notification message receiving submodule configured to receive a first vehicle status notification message sent by the vehicle, where the first vehicle status notification message includes a status parameter of a common part of the vehicle, or a second vehicle status notification message receiving submodule configured to receive a second vehicle status notification message sent by the vehicle, where the second vehicle status notification message includes a status parameter of an alarm part or a faulty part of the vehicle.

With reference to the fifth possible implementation of the fourth aspect, in a seventh possible implementation of the fourth aspect, the notification message receiving submodule includes a road resource use notification message receiving submodule configured to receive a road resource use notification message sent by the vehicle, where the road resource use notification message includes a parameter of a road that has been used by the vehicle.

With reference to the fourth aspect, in an eighth possible implementation of the fourth aspect, the control association module includes a road resource allocation request message receiving submodule configured to receive a road resource allocation request message that is sent by the vehicle and that includes road constraint information, where the road resource allocation request message is used to indicate that the vehicle requests the management device to allocate a road resource to the vehicle according to the road constraint information, and a first road resource allocation response message sending submodule configured to send a first road resource allocation response message including a success identifier and road resource allocation information to the vehicle, where the first road resource allocation response message is used to indicate that the management device succeeds in allocating the road resource to the vehicle such that the vehicle obtains the road resource allocation information, or a second road resource allocation response message sending submodule configured to send a second road resource allocation response message including a failure identifier to the vehicle, where the second road resource allocation response message is used to indicate that the management device fails to allocate the road resource to the vehicle.

With reference to the eighth possible implementation of the fourth aspect, in a ninth possible implementation of the fourth aspect, the control association module further includes a road resource release message receiving submodule configured to receive a road resource release message sent by the vehicle, where the road resource release message is used to instruct the management device to release a road that is not used in the road resource allocation information.

According to a fifth aspect, this application provides a vehicle, including a processor, and a memory configured to store a processor executable instruction, where the processor is configured to perform some or all steps of the method according to the first aspect of this application.

According to a sixth aspect, this application provides a management device, including a processor, and a memory configured to store a processor executable instruction, where the processor is configured to perform some or all steps of the method according to the second aspect of this application.

According to a seventh aspect, this application provides a transportation system, including the vehicle according to the fifth aspect of this application and the management device according to the sixth aspect of this application.

According to an eighth aspect, this application provides a vehicle external communication method, applied to a vehicle in a transportation system, where the method includes sending, by the vehicle, an association registration request message to a management device, where the association registration request message is used to indicate that the vehicle requests to establish a control association with the management device, the control association includes a controlling-controlled relationship that is dynamically established or cancelled between the vehicle and the management device, and the controlling-controlled relationship includes the vehicle sends an application request message to the management device and receives an application response message that is sent by the management device according to the application request message, the vehicle receives an application request message sent by the management device and sends an application response message to the management device according to the application request message, the vehicle sends a notification message to the management device, or the vehicle receives a notification message sent by the management device, and receiving, by the vehicle, a first association registration response message that is sent by the management device and that includes a success identifier, and establishing control association with the management device according to the first association registration response message such that the management device controls, based on the control association, the vehicle to perform a traffic service or application, where the first association registration response message is used to indicate that the vehicle is allowed to establish control association with the management device, or receiving, by the vehicle, a second association registration response message that is sent by the management device and that includes a failure identifier, where the second association registration response message is used to indicate that the vehicle is forbidden to establish control association with the management device.

With reference to the eighth aspect, in a first possible implementation of the eighth aspect, after the establishing, by the vehicle, control association with the management device, the method further includes sending, by the vehicle, an association deregistration request message to the management device, where the association deregistration request message is used to indicate that the vehicle requests to cancel control association with the management device, and receiving, by the vehicle, a first association deregistration response message that is sent by the management device and that includes a success identifier, and canceling control association with the management device according to the first association deregistration response message, where the first association deregistration response message is used to indicate that the vehicle is allowed to cancel control association with the management device, or receiving, by the vehicle, a second association deregistration response message that is sent by the management device and that includes a failure identifier, where the second association deregistration response message is used to indicate that the vehicle is forbidden to cancel control association with the management device.

With reference to the eighth aspect, in a second possible implementation of the eighth aspect, that the management device controls, based on the control association, the vehicle to perform a traffic service or application includes sending, by the vehicle, a user update request message including a user identifier to the management device, where the user update request message is used to indicate that a user corresponding to the user identifier requests to use the vehicle, and receiving, by the vehicle, a first user update response message that is sent by the management device and that includes a success identifier, where the first user update response message is used to indicate that the management device allows the user corresponding to the user identifier to use the vehicle, or receiving, by the vehicle, a second user update response message that is sent by the management device and that includes a failure identifier, where the second user update response message is used to indicate that the management device forbids the user corresponding to the user identifier to use the vehicle.

With reference to the eighth aspect, in a third possible implementation of the eighth aspect, that the management device controls, based on the control association, the vehicle to perform a traffic service or application includes receiving, by the vehicle, a user update message that is sent by the management device and that includes a user identifier, where the user update message is used to indicate that a user corresponding to the user identifier is allowed to use the vehicle.

With reference to the eighth aspect, in a fourth possible implementation of the eighth aspect, that the management device controls, based on the control association, the vehicle to perform a traffic service or application includes receiving, by the vehicle, a query request message that is sent by the management device and that includes a vehicle parameter identifier, and sending, by the vehicle, a query response message to the management device, where the query response message includes a vehicle parameter corresponding to the vehicle parameter identifier.

With reference to the eighth aspect, in a fifth possible implementation of the eighth aspect, that the management device controls, based on the control association, the vehicle to perform a traffic service or application includes sending, by the vehicle to the management device, a notification message including a vehicle parameter corresponding to a vehicle parameter identifier, where the notification message is used to instruct to synchronize the vehicle parameter corresponding to the vehicle parameter identifier to the management device.

With reference to the fifth possible implementation of the eighth aspect, in a sixth possible implementation of the eighth aspect, sending, by the vehicle to the management device, a notification message including a vehicle parameter corresponding to a vehicle parameter identifier includes sending, by the vehicle, a first vehicle status notification message to the management device, where the first vehicle status notification message includes a status parameter of a common part of the vehicle, or sending, by the vehicle, a second vehicle status notification message to the management device, where the second vehicle status notification message includes a status parameter of an alarm part or a faulty part of the vehicle.

With reference to the fifth possible implementation of the eighth aspect, in a seventh possible implementation of the eighth aspect, sending, by the vehicle to the management device, a notification message including a vehicle parameter corresponding to a vehicle parameter identifier includes sending, by the vehicle, a road resource use notification message to the management device, where the road resource use notification message includes a parameter of a road that has been used by the vehicle.

With reference to any one of the fourth to the seventh possible implementations of the eighth aspect, in an eighth possible implementation of the eighth aspect, the vehicle parameter identifier includes at least one of a vehicle item identifier and a vehicle subitem identifier, and a vehicle parameter corresponding to the vehicle item identifier includes a vehicle parameter corresponding to the vehicle subitem identifier.

With reference to the eighth aspect, in a ninth possible implementation of the eighth aspect, that the management device controls, based on the control association, the vehicle to perform a traffic service or application includes sending, by the vehicle, a road resource allocation request message including road constraint information to the management device, where the road resource allocation request message is used to indicate that the vehicle requests the management device to allocate a road resource to the vehicle according to the road constraint information, and receiving, by the vehicle, a first road resource allocation response message that is sent by the management device and that includes a success identifier and road resource allocation information, where the first road resource allocation response message is used to indicate that the management device succeeds in allocating the road resource to the vehicle such that the vehicle obtains the road resource allocation information, or receiving, by the vehicle, a second road resource allocation response message that is sent by the management device and that includes a failure identifier, where the second road resource allocation response message is used to indicate that the management device fails to allocate the road resource to the vehicle.

With reference to the ninth possible implementation of the eighth aspect, in a tenth possible implementation of the eighth aspect, after the vehicle obtains the road resource allocation information, the method further includes sending, by the vehicle, a road resource release message to the management device, where the road resource release message is used to instruct the management device to release a road that is not used in the road resource allocation information.

With reference to the eighth aspect, in an eleventh possible implementation of the eighth aspect, the sending, by the vehicle, an association registration request message to a management device includes obtaining, by the vehicle, management device identity information, and sending, by the vehicle, the association registration request message to a management device corresponding to the management device identity information.

With reference to the eighth aspect, in a twelfth possible implementation of the eighth aspect, sending, by the vehicle, an association registration request message to a management device, where the association registration request message is used to indicate that the vehicle requests to establish a control association with the management device includes sending, by the vehicle, an association registration request message including vehicle identity information to the management device, where the association registration request message is used to indicate that a vehicle corresponding to the vehicle identity information requests to establish a control association with the management device.

According to a ninth aspect, this application provides a vehicle external communication method, applied to a management device in a transportation system, where the method includes receiving, by the management device, an association registration request message sent by a vehicle, where the association registration request message is used to indicate that the vehicle requests to establish a control association with the management device, the control association includes a controlling-controlled relationship that is dynamically established or cancelled between the vehicle and the management device, and the controlling-controlled relationship includes the management device receives an application request message sent by the vehicle and sends an application response message to the vehicle according to the application request message, the management device sends an application request message to the vehicle and receives an application response message that is sent by the vehicle according to the application request message, the management device receives a notification message sent by the vehicle, or the management device sends a notification message to the vehicle, and sending, by the management device, a first association registration response message including a success identifier to the vehicle such that the vehicle establishes control association with the management device according to the first association registration response message, where the first association registration response message is used to indicate that the vehicle is allowed to establish control association with the management device, and controlling, by the management device based on the control association, the vehicle to perform a traffic service or application, or sending, by the management device, a second association registration response message including a failure identifier to the vehicle, where the second association registration response message is used to indicate that the vehicle is forbidden to establish control association with the management device.

With reference to the ninth aspect, in a first possible implementation of the ninth aspect, after establishing, by the vehicle, control association with the management device, the method further includes receiving, by the management device, an association deregistration request message sent by the vehicle, where the association deregistration request message is used to indicate that the vehicle requests to cancel control association with the management device, and sending, by the management device, a first association deregistration response message including a success identifier to the vehicle such that the vehicle cancels control association with the management device according to the first association deregistration response message, where the first association deregistration response message is used to indicate that the vehicle is allowed to cancel control association with the management device, or sending, by the management device, a second association deregistration response message including a failure identifier to the vehicle, where the second association deregistration response message is used to indicate that the vehicle is forbidden to cancel control association with the management device.

With reference to the ninth aspect, in a second possible implementation of the ninth aspect, controlling, by the management device based on the control association, the vehicle to perform a traffic service or application includes receiving, by the management device, a user update request message that is sent by the vehicle and that includes a user identifier, where the user update request message is used to indicate that a user corresponding to the user identifier requests to use the vehicle, and sending, by the management device, a first user update response message including a success identifier to the vehicle, where the first user update response message is used to indicate that the management device allows the user corresponding to the user identifier to use the vehicle, or sending, by the management device, a second user update response message including a failure identifier to the vehicle, where the second user update response message is used to indicate that the management device forbids the user corresponding to the user identifier to use the vehicle.

With reference to the ninth aspect, in a third possible implementation of the ninth aspect, controlling, by the management device based on the control association, the vehicle to perform a traffic service or application includes sending, by the management device, a user update message including a user identifier to the vehicle, where the user update message is used to indicate that a user corresponding to the user identifier is allowed to use the vehicle.

With reference to the ninth aspect, in a fourth possible implementation of the ninth aspect, controlling, by the management device based on the control association, the vehicle to perform a traffic service or application includes sending, by the management device, a query request message to the vehicle, and receiving, by the management device, a query response message sent by the vehicle, where the query response message includes a vehicle parameter corresponding to a vehicle parameter identifier.

With reference to the ninth aspect, in a fifth possible implementation of the ninth aspect, controlling, by the management device based on the control association, the vehicle to perform a traffic service or application includes receiving, by the management device, a notification message that is sent by the vehicle and that includes a vehicle parameter corresponding to a vehicle parameter identifier, where the notification message is used to instruct to synchronize the vehicle parameter corresponding to the vehicle parameter identifier to the management device.

With reference to the fifth possible implementation of the ninth aspect, in a sixth possible implementation of the ninth aspect, receiving, by the management device, a notification message that is sent by the vehicle and that includes a vehicle parameter corresponding to a vehicle parameter identifier includes receiving, by the management device, a first vehicle status notification message sent by the vehicle, where the first vehicle status notification message includes a status parameter of a common part of the vehicle, or receiving, by the management device, a second vehicle status notification message sent by the vehicle, where the second vehicle status notification message includes a status parameter of an alarm part or a faulty part of the vehicle.

With reference to the fifth possible implementation of the ninth aspect, in a seventh possible implementation of the ninth aspect, receiving, by the management device, a notification message that is sent by the vehicle and that includes a vehicle parameter corresponding to a vehicle parameter identifier includes receiving, by the management device, a road resource use notification message sent by the vehicle, where the road resource use notification message includes a parameter of a road that has been used by the vehicle.

With reference to the ninth aspect, in an eighth possible implementation of the ninth aspect, controlling, by the management device based on the control association, the vehicle to perform a traffic service or application includes receiving, by the management device, a road resource allocation request message that is sent by the vehicle and that includes road constraint information, where the road resource allocation request message is used to indicate that the vehicle requests the management device to allocate a road resource to the vehicle according to the road constraint information, and sending, by the management device, a first road resource allocation response message including a success identifier and road resource allocation information to the vehicle, where the first road resource allocation response message is used to indicate that the management device succeeds in allocating the road resource to the vehicle such that the vehicle obtains the road resource allocation information, or sending, by the management device, a second road resource allocation response message including a failure identifier to the vehicle, where the second road resource allocation response message is used to indicate that the management device fails to allocate the road resource to the vehicle.

With reference to the eighth possible implementation of the ninth aspect, in a ninth possible implementation of the ninth aspect, after the vehicle obtains the road resource allocation information, the method further includes receiving, by the management device, a road resource release message sent by the vehicle, where the road resource release message is used to instruct the management device to release a road that is not used in the road resource allocation information.

It should be understood that the second to the ninth aspects and possible implementations in embodiments of this application have a similar technical idea and same beneficial effects as the first aspect and possible implementations in the embodiments of this application, and details are not described again.

According to technical solutions provided in the embodiments of this application, the control association between the vehicle and the management device is used as a precondition for participation of the vehicle in a road traffic activity such that all vehicles participating in the road traffic activity can be scheduled and controlled by the management device together, and vehicle safety and passing efficiency can be improved.

BRIEF DESCRIPTION OF THE DRAWINGS

To describe the technical solutions in some of the embodiments of this application more clearly, the following briefly describes the accompanying drawings describing some of the embodiments. A person of ordinary skill in the art may still derive other drawings from these accompanying drawings without creative efforts.

DESCRIPTION OF EMBODIMENTS

To make a person skilled in the art understand the technical solutions in this application better, the following clearly describes the technical solutions in the embodiments of this application with reference to the accompanying drawings in the embodiments of this application. The described embodiments are merely some but not all of the embodiments of this application. All other embodiments obtained by a person of ordinary skill in the art based on the embodiments of this application without creative efforts shall fall within the protection scope of this application.

For ease of description, in the embodiments of this application, an ITS is used as an application environment of a vehicle external communication solution provided in the embodiments of this application. However, it should be understood that a person skilled in the art may apply the vehicle external communication solution provided in the embodiments of this application to another type of transportation system, which shall fall within the protection scope of this application.

Traffic participants in the ITS in the embodiments of this application may include a vehicle, a management center, and a road-side infrastructure. Quantities and representation forms of vehicles, management centers, and road-side infrastructures are not limited in the embodiments of this application. For example, the vehicle in the embodiments of this application may include an ambulance, a taxi, a private car, or the like.

The vehicle in the embodiments of this application may be a vehicle that has a wireless communication function, or may be a vehicle that carries a wireless communications device. The wireless communications device may include various handheld devices, in-vehicle devices, computer devices, or wearable devices that have a wireless communication function, or user equipment in various forms.

The management center in the embodiments of this application is a specific place in which a management device is disposed. The management device may be a computer device that has functions of communication, storage, and data processing, and is a control center in the ITS. Both the management device and the management center in the embodiments of this application can represent the control center in the ITS.

Figure 1:
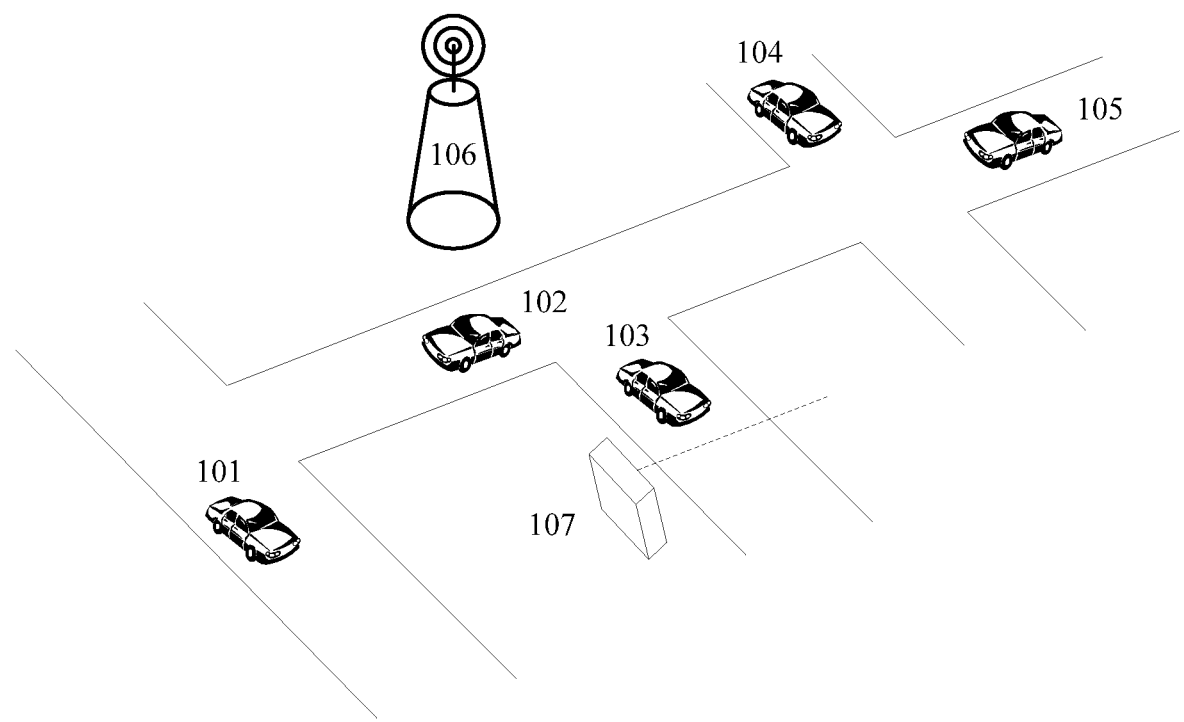
FIG. 1 is a schematic scenario diagram of an ITS according to an embodiment of this application.

Referring to FIG. 1, FIG. 1 is a schematic scenario diagram of an ITS according to an embodiment of this application.

In the ITS shown in FIG. 1, traffic participants include vehicles 101 to 105, a management center 106, and a road-side infrastructure 107. The traffic participants are connected using a network. The traffic participants can not only directly exchange information with each other, but also indirectly exchange information with each other. For example, a vehicle can directly exchange information with the management center 106, a vehicle can directly exchange information with the roadside infrastructure 107, the management center 106 can directly exchange information with the roadside infrastructure 107, and two vehicles can directly exchange information. Alternatively, a vehicle can indirectly exchange information with the roadside infrastructure 107 using the management center 106, and two vehicles can indirectly exchange information using the management center 106.

In the ITS, to improve vehicle safety and passing efficiency, a vehicle needs to frequently interact with another traffic participant, and a process of interaction between the vehicle and the other traffic participant includes collection, processing, and exchange of a large amount of information of the vehicle. Therefore, the vehicle and the other traffic participant in the ITS are needed to have a common understanding of vehicle information and related function control, and to be capable of simply and efficiently performing synchronous extension and update as more new functions and new services appear. Based on this requirement, an embodiment of this application provides a data structure of the vehicle information and a message structure used for communication between the vehicle and the other traffic participant.

Figure 2:
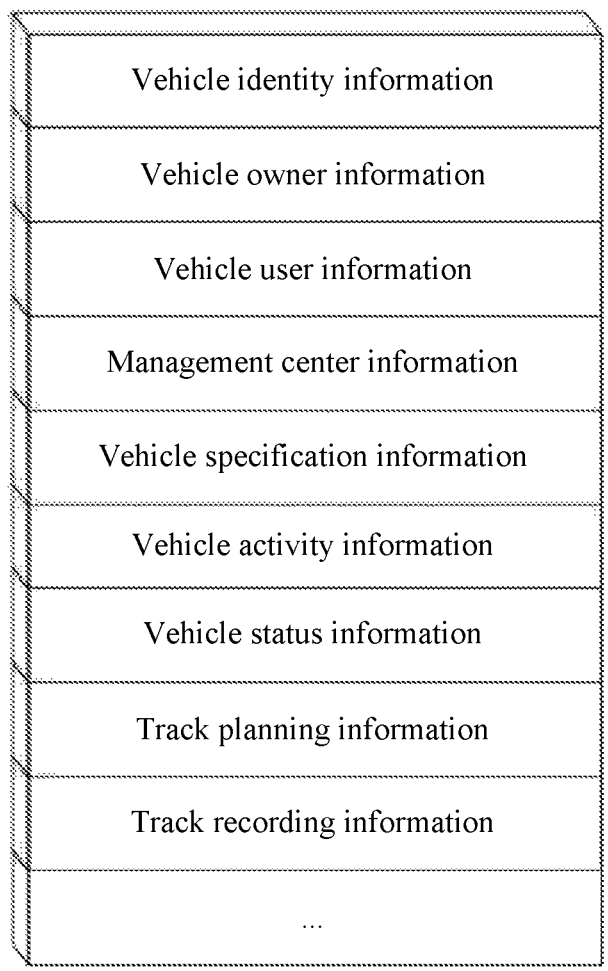
FIG. 2 is a schematic diagram of a data structure of vehicle information according to an embodiment of this application.

Referring to FIG. 2, FIG. 2 is a schematic diagram of a data structure of vehicle information according to an embodiment of this application. As shown in FIG. 2, the data structure includes vehicle identity information, vehicle owner information, vehicle user information, management center information, vehicle specification information, vehicle activity information, vehicle status information, track planning information, track recording information, and other vehicle information that is extended according to a vehicle function requirement by a person skilled in the art.

The vehicle identity information is used to record a vehicle identifier and vehicle authentication information. The vehicle identifier is a unique identifier of a vehicle in a transportation system, and other information in the data structure may be associated, using the vehicle identifier, with the vehicle represented by the vehicle identifier.

The vehicle owner information is used to record an owner identifier and owner authentication information. The authentication information is used to record whether a member corresponding to the owner identifier is authenticated. If the member is authenticated, the member corresponding to the owner identifier has ownership of the vehicle, that is, a supreme right to control the vehicle. In addition, one vehicle may be owned by multiple persons (for example, a family vehicle is owned by a husband and a wife), that is, have multiple owners. In this case, an owner identifier corresponding to each owner and authentication information of each owner are separately recorded to form an owner list.

The vehicle user information is used to record a user identifier and user authentication information. The authentication information is used to record whether a member corresponding to the user identifier is authenticated. If the member is authenticated, the member corresponding to the user identifier has a right to use a vehicle. The owner may specify a user to grant the user the right to use the vehicle. In addition, one vehicle may include multiple users (for example, all members in a family have a right to use a family vehicle). In this case, a user identifier corresponding to each user and authentication information of each user are separately recorded, to form a user list.

The management center information is used to record an identifier of a management center managing the vehicle and management center authentication information. The authentication information is used to record whether the management center corresponding to the identifier of the management center is authenticated. If the management center is authenticated, the management center has a right to manage the vehicle. In addition, one vehicle may be controlled by multiple management centers, and each management center is separately recorded, to form a list of management centers arranged in descending order of priorities. The priorities may be set for the multiple management centers according to control levels of the management centers, distances between the vehicle and the management centers, or signal strength of the management centers.

The vehicle specification information is used to record vehicle information that is determined during manufacturing, such as a vehicle model, load, or emission, and may include a vehicle specification identifier, a vehicle specification sub-identifier, and values of the vehicle specification identifier and the vehicle specification sub-identifier.

The vehicle activity information is used to record vehicle information that changes in an activity, such as a direction, a speed, or braking, and may include a vehicle activity identifier, a vehicle activity sub-identifier, and values of the vehicle activity identifier and the vehicle activity sub-identifier.

The vehicle status information is used to record operating statuses of vehicle parts such as a power part, a steering part, or a tire part, and may include a vehicle status identifier, a vehicle status sub-identifier, and values of the vehicle status identifier and the vehicle status sub-identifier. For example, the value of the vehicle status identifier or the vehicle status sub-identifier may be normal, alarmed, or faulty.

The track planning information is used to record a travelling route planned by a vehicle, and may further include one or a combination of a time coordinate sequence and a spatial coordinate sequence of planned waypoints.

The track recording information is used to record an actual travelling route of a vehicle, and may include one or a combination of a time coordinate sequence and a spatial coordinate sequence of actual waypoints.

Figure 3:
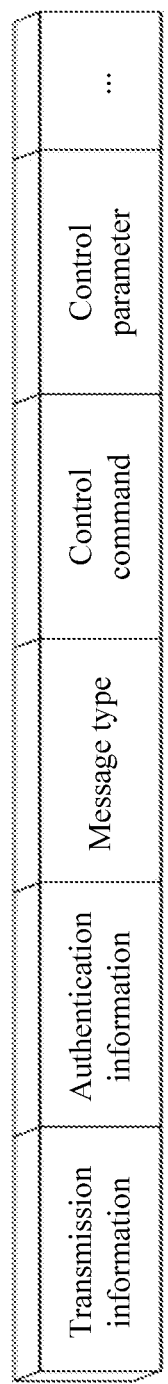
FIG. 3 is a schematic diagram of a message structure used for vehicle external communication according to an embodiment of this application.

Referring to FIG. 3, FIG. 3 is a schematic diagram of a message structure used for vehicle external communication according to an embodiment of this application. As shown in FIG. 3, the message structure includes transmission information, authentication information, a message type, a control command, and a control parameter. Certainly, a person skilled in the art may add other information to the message structure according to a vehicle function requirement, to extend the message structure.

The transmission information may include a source address, a destination address, a protocol type, and the like, and may use different transmission protocols and versions.

The authentication information may include a safety parameter index, a sequence number, authentication data, and the like, and may use different authentication schemes and algorithms.

The message type may include a request, a response, a response acknowledgement, and the like.

The control command may include registration/deregistration, application, update, release, query, notification, and the like.

The control parameter may include a vehicle identifier and other information that is set according to a vehicle function requirement, for example, management center information, vehicle user information, a success/failure identifier, or a cause description.

In an ITS, vehicle information is stored on a vehicle, a management device, or another storage device according to the foregoing data structure, and information is exchanged between the vehicle and another traffic participant according to the foregoing message structure, to complete a corresponding control function.

Figure 4:
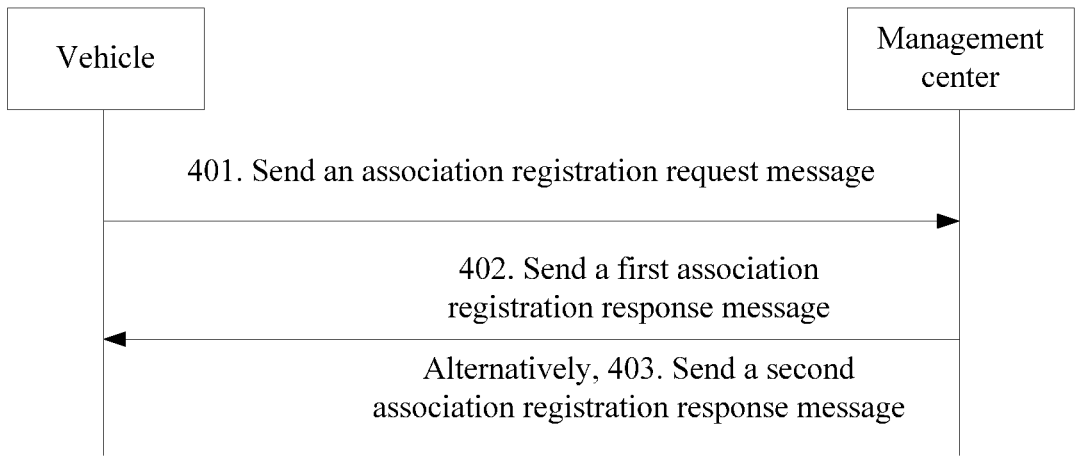
FIG. 4 is a schematic flowchart of a vehicle external communication method according to an embodiment of this application.

This application further provides a vehicle external communication method based on the foregoing data structure and message structure. Referring to FIG. 4, FIG. 4 is a schematic flowchart of a vehicle external communication method according to an embodiment of this application. Because a vehicle and a management center are main participants of the method, the method may be applied to a vehicle, a management center, or a communications system including a vehicle and a management center. The method mainly includes the following steps.

Step 401: The vehicle sends an association registration request message to the management center.

Because the management center is a control center in an ITS, the vehicle needs to establish a control association with the management center before participating in a road traffic activity. The control association is a controlling-controlled relationship, and in this embodiment of this application, is a controlling-controlled relationship between the vehicle and the management center and includes the following. The vehicle sends an application request message to the management center and receives an application response message that is sent by the management center according to the application request message, the vehicle receives an application request message sent by the management center and sends an application response message to the management center according to the application request message, the vehicle sends a notification message to the management center, or the vehicle receives a notification message sent by the management center. The management center can control, based on the control association, the vehicle to perform a traffic service or application.

In addition, to improve resource utilization in a transportation system or find a most appropriate management center for the vehicle, the vehicle needs to dynamically establish or cancel control association with the management center. For example, when the vehicle completes the road traffic activity to save a communication resource in the transportation system, the vehicle cancels control association with the management center. When there are multiple management centers in the transportation system, and the vehicle travels from a control area of one management center to a control area of another management center, the vehicle needs to cancel a control association with a management center that the vehicle is to leave, and establish a control association with a management center that the vehicle is to travel into.

In this embodiment of this application, the vehicle sends the association registration request message to the management center before establishing control association with the management center. To determine the vehicle that sends the association registration request message, the association registration request message may include vehicle identity information, for example, a vehicle identifier, vehicle authentication information, or vehicle identity information of another type.

In this specification, for brief description, the vehicle identifier is uniformly used as the vehicle identity information for description.

In this embodiment of this application, a message type of the association registration request message is a request, a control command is registration, and a control parameter includes the vehicle identifier. The association registration request message is used to indicate that the vehicle corresponding to the vehicle identifier requests to register with the ITS, that is, requests to establish control association with the management center. The vehicle identifier is a unique identity of the vehicle in the ITS, and is used to mark the vehicle. Other vehicle information in a data structure may be associated, using the vehicle identifier, with the vehicle represented by the vehicle identifier.

In an optional embodiment of this application, the ITS may include multiple management centers, but not each management center has a right to manage the vehicle. Therefore, the vehicle further needs to determine an identity of the management center before establishing control association with the management center. Further, the vehicle obtains management center identity information, for example, a management center identifier, management center authentication information, or management center identity information of another type. The vehicle sends the association registration request message to a management center corresponding to the management center identity information.

In addition, when vehicle information includes a management center list including information about multiple management centers, the vehicle may obtain identity information of the first management center in the management center list. Because the management center list is formed in descending order of priorities, the identity information of the first management center in the management center list corresponds to a management center having a highest priority. Priorities of the management centers may be set according to control levels of the management centers, distances between the vehicle and the management centers, or signal strength of the management centers.

Step 402: The management center sends a first association registration response message to the vehicle.

After receiving the association registration request message, the management center may determine, according to the vehicle identity information in the association registration request message, the vehicle that requests to establish the association, and may further need to determine, according to information such as permission of the vehicle or a current traffic environment, whether to allow the vehicle to register with the ITS. When the management center allows the vehicle to register with the ITS, the management center sends the first association registration response message to the vehicle.

A message type of the first association registration response message is a response, a control command is registration, and a control parameter includes a success identifier. The first association registration response message is used to indicate that the management center allows the vehicle to register with the ITS such that the vehicle establishes control association with the management center.

In addition, when the management center does not allow the vehicle to register with the ITS, step 402 is replaced with the following step 403.

Step 403: The management center sends a second association registration response message to the vehicle.

A message type of the second association registration response message is a response, a control command is registration, and a control parameter is a failure identifier. The second association registration response message is used to indicate that the management center forbids the vehicle to establish control association with the management center, that is, forbids the vehicle to register with the ITS.

According to the method provided in this embodiment of this application, the control association between the vehicle and the management center is used as a precondition for participation of the vehicle in the road traffic activity such that all vehicles participating in the road traffic activity can be scheduled and controlled by the management center together, and vehicle safety and passing efficiency can be improved.

Figure 5:
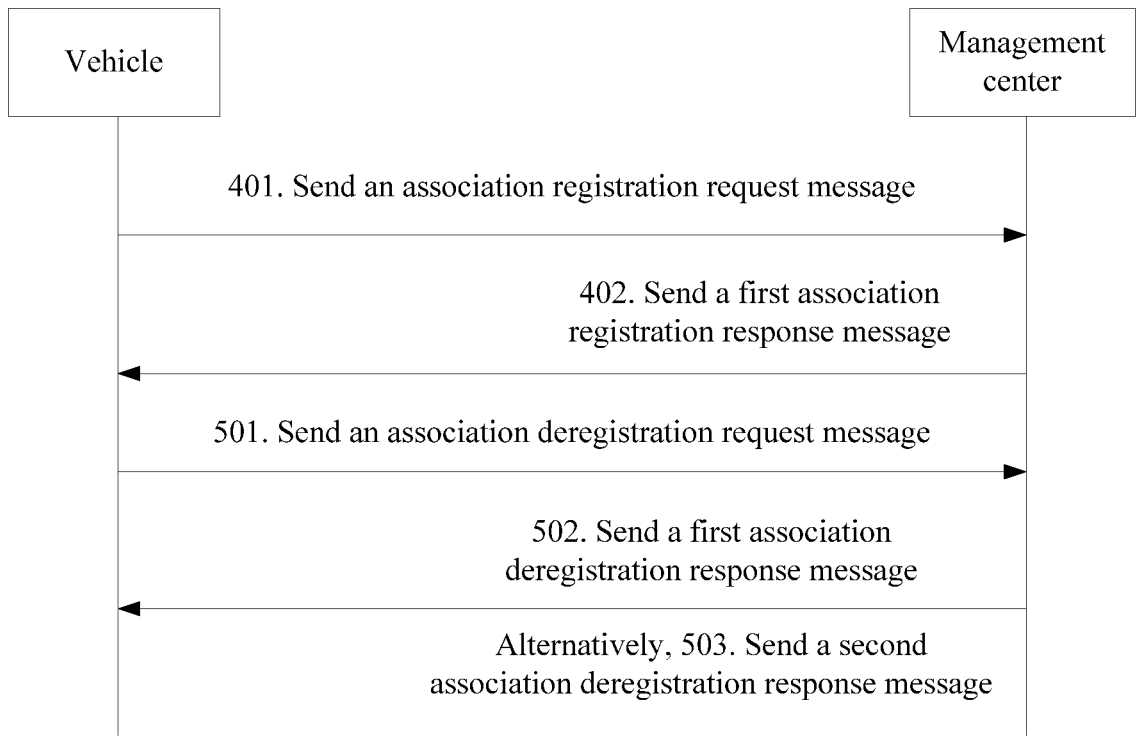
FIG. 5 is a schematic flowchart of another vehicle external communication method according to an embodiment of this application.

Referring to FIG. 5, FIG. 5 is a schematic flowchart of another vehicle external communication method according to an embodiment of this application. As shown in FIG. 5, after receiving a first association registration response message sent by a management center, a vehicle establishes a control association with the management center according to the first association registration response message. In this embodiment of this application, the control association includes one of the following. The vehicle sends an application request message to the management center and receives an application response message that is sent by the management center according to the application request message. The control association includes the following steps.

Step 501: The vehicle sends an association deregistration request message to the management center.

After the vehicle completes a road traffic activity, a resource in an ITS is wasted if the association with the management center is still maintained. Therefore, after completing the road traffic activity, the vehicle needs to cancel control association with the management center. A message type of the association deregistration request message is a request, a control command is deregistration, and a control parameter includes a vehicle identifier. The association deregistration request message is used to indicate that the vehicle corresponding to the vehicle identifier requests to deregister from the ITS, that is, requests to cancel control association with the management center.

Step 502: The management center sends a first association deregistration response message to the vehicle.

After receiving the association deregistration request message, the management center may determine, according to the vehicle identifier in the association deregistration request message, the vehicle that requests to cancel the control association, and may further need to determine, according to a current status of the vehicle, whether to allow the vehicle to cancel control association with the management center. When the management center allows the vehicle to cancel the control association, the management center sends the first association deregistration response message to the vehicle.

A message type of the first association deregistration response message is a response, a control command is deregistration, and a control parameter includes a success identifier. The first association deregistration response message is used to indicate that the management center allows the vehicle to deregister from the ITS such that the vehicle cancels control association with the management center.

In addition, when the management center forbids the vehicle to deregister from the ITS, step 502 is replaced with the following step 503.

Step 503: The management center sends a second association deregistration response message to the vehicle.

A message type of the second association deregistration response message is a response, a control command is deregistration, and a control parameter includes a failure identifier. The second association deregistration response message is used to indicate that the management center forbids the vehicle to deregister from the ITS, that is, forbids the vehicle to cancel control association with the management center.

According to the method provided in this embodiment of this application, the management center can dynamically manage a vehicle in a transportation system by controlling, according to a vehicle requirement or a current traffic environment, the vehicle to join or exit the transportation system. Therefore, not only resource utilization is improved, but a dynamically changing requirement of the vehicle in the transportation system is also satisfied.

Figure 6:
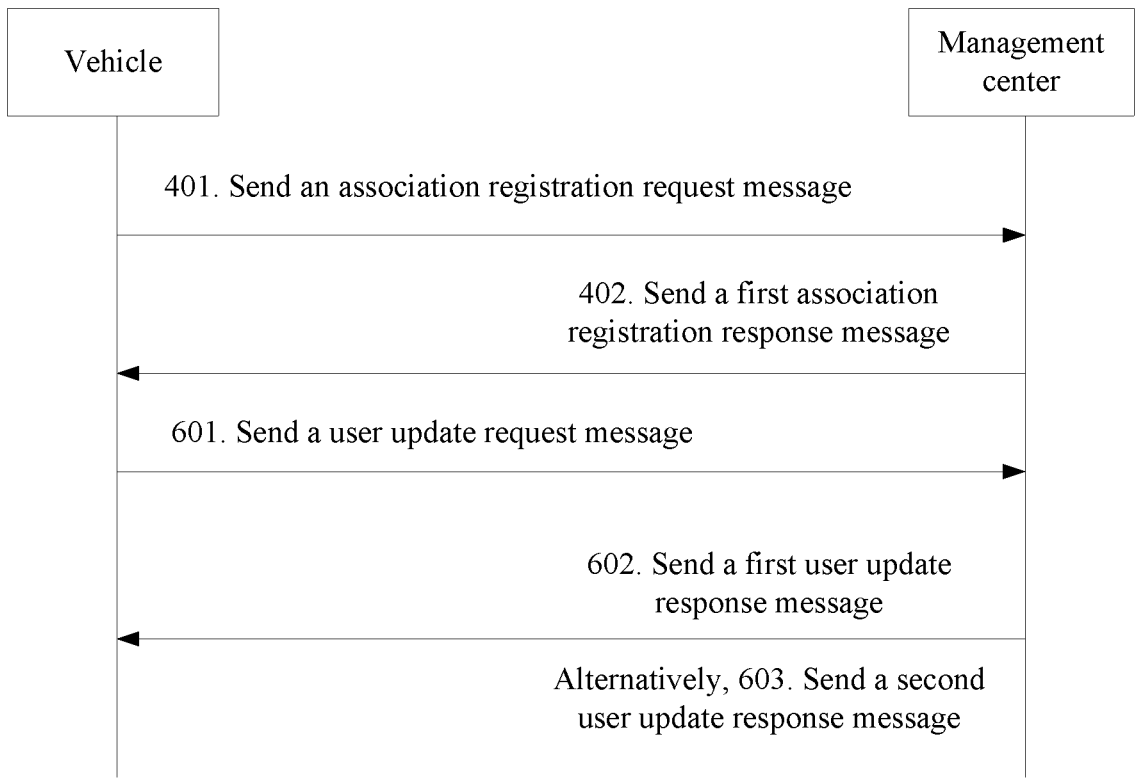
FIG. 6 is a schematic flowchart of another vehicle external communication method according to an embodiment of this application.

FIG. 6 is a schematic flowchart of another vehicle external communication method according to an embodiment of this application. As shown in FIG. 6, after receiving a first association registration response message sent by a management center, a vehicle establishes a control association with the management center according to the first association registration response message. In this embodiment of this application, the control association includes one of the following. The vehicle sends an application request message to the management center and receives an application response message that is sent by the management center according to the application request message. The control association includes the following steps.

Step 601: The vehicle sends a user update request message to the management center.

Usually, a vehicle user may frequently change. For example, if a user A lends a private car to a user B, a user of the private car changes from the user A to the user B. When the user A lends the private car to the user B, if the user B can directly drive the private car without identity authentication, it is equivalent to that any user can have a right to use the private car, and in this case, vehicle safety cannot be ensured.

In this embodiment of this application, to improve vehicle safety in an ITS, the management center manages vehicle users together, and only a user that is authenticated by the management center can have the right to use the vehicle. Therefore, when vehicle user information needs to be updated, a vehicle owner may instruct the vehicle to update the vehicle user information. Further, the vehicle sends the user update request message to the management center. A message type of the user update request message is a request, a control command is update, and a control parameter includes a vehicle identifier and a user identifier. The user update request message is used to indicate that a user corresponding to the user identifier requests to have a right to use a vehicle, and the vehicle is a vehicle corresponding to the vehicle identifier.

It should be noted that a quantity of user identifiers is not limited in this embodiment of this application. For example, there may be one user identifier, or there may be more than one user identifier that is used for updating information about multiple users of the vehicle.

Step 602: The management center sends a first user update response message to the vehicle.

After receiving the user update request message, the management center may determine, according to the vehicle identifier in the user update request message, the vehicle that requests to update a user, and determine, according to the user identifier, the user corresponding to the user identifier, and may further need to determine, according to identity information of the user, whether to allow the user to use the vehicle, that is, whether to allow the user to be authenticated. If the user is authenticated, the management center sends the first user update response message to the vehicle.

A message type of the first user update response message is a response, a control command is update, and a control parameter includes a success identifier. The first user update response message is used to indicate that the user corresponding to the user identifier is allowed to use the vehicle.

In addition, if the user is not authenticated, step 602 is replaced with the following step 603.

Step 603: The management center sends a second user update response message to the vehicle.

A message type of the second user update response message is a response, a control command is update, and a control parameter includes a failure identifier. The second user update response message is used to indicate that the management device forbids the user corresponding to the user identifier to use the vehicle.

In addition to instructing the vehicle to send the vehicle user update request message to the management center, the vehicle owner or a user in an owner list can send the vehicle user update request message to the management center using another device or directly send the vehicle user update request message to the management center. A specific implementation of sending the vehicle user update request message is not limited in this application.

In addition, the vehicle user information may be updated based on an instruction of the management center in addition to a request of the user. Further, the management center sends, to the vehicle, a vehicle user update message including the user identifier. A control command of the vehicle user update message is update, and a control parameter includes the user identifier. The vehicle user update message is used to indicate that the user corresponding to the user identifier is allowed to have the right to use the vehicle.

According to the method provided in this embodiment of this application, the management center manages vehicle users together, and only the user authenticated by the management center can use the vehicle. Therefore, vehicle safety in the transportation system can be improved.

Figure 7:
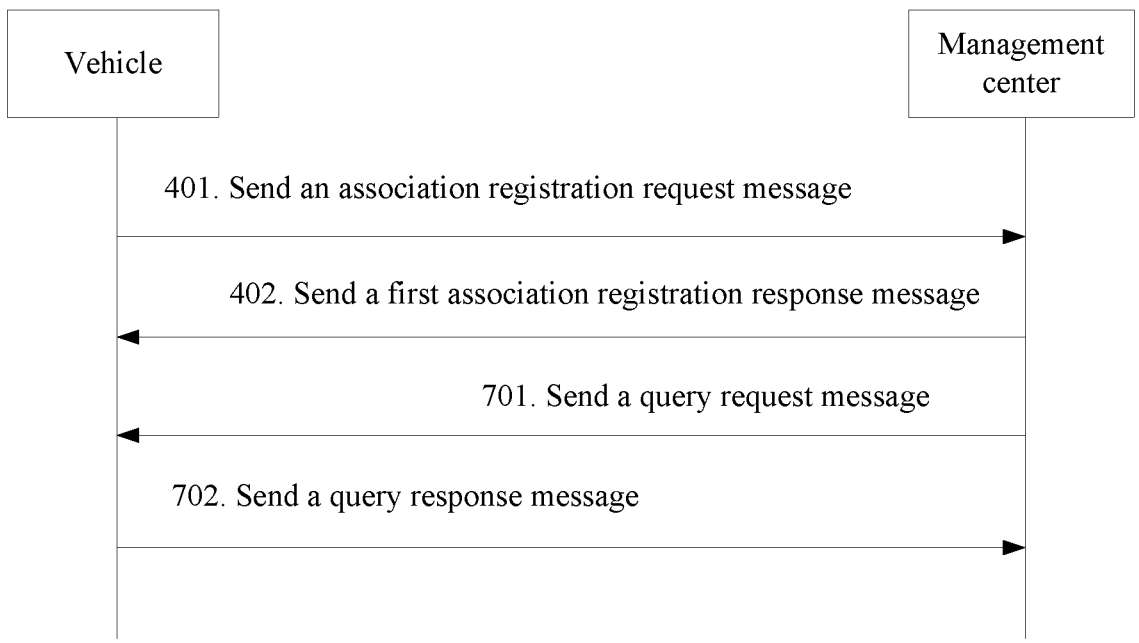
FIG. 7 is a schematic flowchart of another vehicle external communication method according to an embodiment of this application.

Referring to FIG. 7, FIG. 7 is a schematic flowchart of another vehicle external communication method according to an embodiment of this application. As shown in FIG. 7, after receiving a first association registration response message sent by a management center, a vehicle establishes a control association with the management center according to the first association registration response message. In this embodiment of this application, the control association includes one of the following. The vehicle receives an application request message sent by the management center and sends an application response message to the management center according to the application request message. The control association includes the following steps.

Step 701: The management device sends a query request message to the vehicle.

The management center is a control center in an ITS, and may need to periodically query vehicle information, to synchronize the vehicle information in the management center. For example, the management center may need to query vehicle specification information or vehicle status information.

In this embodiment of this application, the management center sends the query request message to the vehicle. A message type of the query request message is a request, a control command is query, and a control parameter includes a vehicle identifier and a vehicle parameter identifier. The vehicle identifier is used to determine a vehicle that needs to be queried, and the vehicle parameter identifier is used to determine a vehicle parameter that needs to be queried, for example, vehicle specification information, vehicle activity information, or vehicle status information.

Further, the vehicle parameter identifier may include a vehicle item identifier or a vehicle subitem identifier. The vehicle subitem identifier is a subitem of the vehicle item identifier, that is, a vehicle parameter corresponding to the vehicle item identifier includes a vehicle parameter corresponding to the vehicle subitem identifier. For example, the vehicle item identifier may include a vehicle specification identifier, a vehicle activity identifier, and a vehicle status identifier. Subitems in the vehicle specification identifier may include a vehicle model identifier, a load identifier, and an emission identifier. Subitems in the vehicle activity identifier may include a direction identifier, a speed identifier, and a braking identifier. Subitems in the vehicle status identifier may include a power part identifier, a steering part identifier, and a tire part identifier. The vehicle parameter identifier may include any combination of the foregoing vehicle item identifiers and vehicle subitem identifiers. For example, when the vehicle parameter identifier is the vehicle specification identifier, the vehicle parameter identifier is used to indicate that all vehicle specification information of the vehicle is queried, including a vehicle model parameter, a load parameter, and an emission parameter. When the vehicle parameter identifier is the vehicle model identifier, the vehicle parameter identifier is used to indicate that the vehicle model parameter of the vehicle is queried. The vehicle model parameter includes the vehicle model identifier and a value of the vehicle model identifier. The load parameter includes the load identifier and a value of the load identifier. The emission parameter includes the emission identifier and a value of the emission identifier. Because not all vehicle information is necessarily needed in a service interaction process, when the vehicle parameter is organized using the vehicle item identifier and the vehicle subitem identifier, communication resource waste can be avoided, and communication efficiency can be improved.

Step 702: The vehicle sends a query response message to the management center.

After receiving the query request message sent by the management center, the vehicle sends the query response message to the management center. A message type of the query response message is a response, a control command is query, and a control parameter includes the vehicle parameter corresponding to the vehicle parameter identifier. For example, when the vehicle parameter identifier is the load identifier, a vehicle parameter corresponding to the load identifier may be load tonnage of the vehicle, for example, two tons.

In addition to receiving the query request message sent by the management center, the vehicle may receive a query request message sent by another traffic participant in a transportation system, and send a query response message to the other traffic participant. The other traffic participant may include a road-side infrastructure or another vehicle.

According to the method provided in this embodiment of this application, the management center can query corresponding vehicle information according to a requirement to perform corresponding function control on the vehicle according to the vehicle information or provide a corresponding service for the vehicle according to the vehicle information.

In this embodiment of this application, in addition to passively sending the vehicle information to the other traffic participant based on the query request message, the vehicle may actively send the vehicle information to the other traffic participant using a notification message. For example, after receiving the first association registration response message sent by the management center, the vehicle establishes control association with the management center according to the first association registration response message. In this embodiment of this application, the control association includes one of the following. The vehicle sends a notification message to the management device. Further, the vehicle sends, to the other traffic participant in the transportation system, a notification message including a vehicle parameter corresponding to a vehicle parameter identifier. The notification message is used to instruct to synchronize the vehicle parameter corresponding to the vehicle parameter identifier to the other traffic participant.

In an optional embodiment of this application, when normally participating in a road traffic activity, the vehicle may periodically send a first vehicle status notification message to the other traffic participant in the transportation system. A control command of the first vehicle status notification message is notification, and a control parameter includes the vehicle identifier and a status parameter of a common part of the vehicle, for example, a power part parameter, a steering part parameter, or a tire part parameter. The other traffic participant is periodically notified of the vehicle status information such that vehicle safety in the transportation system can be improved. For example, the management center is periodically notified of the vehicle status information such that the management center can periodically check an operating status of the vehicle, and may further give a maintenance advice based on the vehicle status information.

When the vehicle has an alarm part or a faulty part, the vehicle immediately sends a second vehicle status notification message to the other traffic participant in the transportation system. A control command of the second vehicle status notification message is notification, and a control parameter includes the vehicle identifier and a status parameter of the alarm part or the faulty part of the vehicle. For example, when a tire of the vehicle is short of atmospheric pressure, the control parameter includes a tire part parameter. When the vehicle has the alarm part or the faulty part, the vehicle immediately notifies the other traffic participant of the status parameter of the alarm part or the faulty part such that the other traffic participant can learn fault information of the vehicle in time, and the other traffic participant provides safeguard measures for the vehicle according to the fault information of the vehicle, for example, schedules a road resource for the vehicle or gives way to the vehicle, to reduce a probability that the vehicle encounters a severe accident.

In addition to notifying the other traffic participant in the transportation system of the vehicle status information, the vehicle may notify the other traffic participant of track recording information.

In an optional embodiment of this application, when participating in a road traffic activity, the vehicle sends a road resource use notification message to the other traffic participant in the transportation system. The road resource use notification message includes the track recording information of the vehicle, for example, a parameter of a road that has been used by the vehicle. According to the method provided in this embodiment of this application, the vehicle can notify the other traffic participant of information about the road that has been used by the vehicle such that the road that has been used is used by the other traffic participant in time, and road resource utilization is improved.

Figure 8:
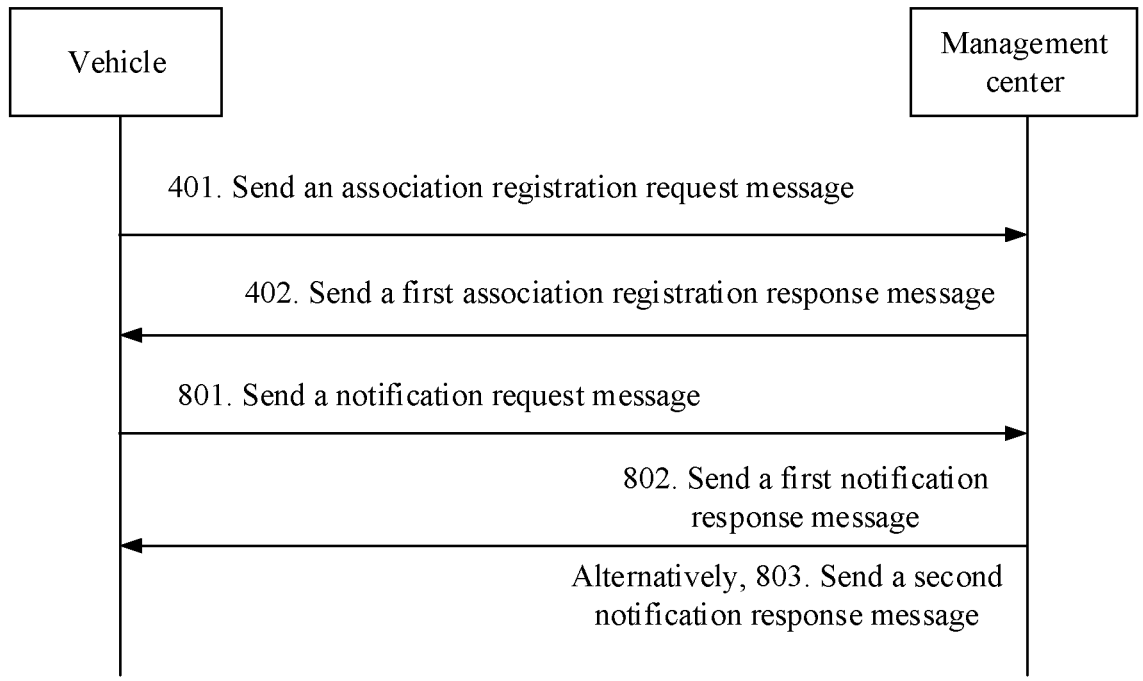
FIG. 8 is a schematic flowchart of another vehicle external communication method according to an embodiment of this application.

In addition, to improve reliability of the notification message, the notification message may participate in information exchange in the transportation system based on a request/response mechanism. Referring to FIG. 8, FIG. 8 is a schematic flowchart of another vehicle external communication method according to an embodiment of this application. As shown in FIG. 8, after receiving a first association registration response message sent by a management center, a vehicle establishes a control association with the management center according to the first association registration response message. In this embodiment of this application, the control association includes the following steps.

Step 801: The vehicle sends a notification request message to the management center.

In this embodiment of this application, the vehicle can actively send the notification request message to the management center, to synchronize vehicle information of the vehicle to the management center such that the management center updates, in time, vehicle information stored on the management center.

A message type of the notification request message is a request, a control command is notification, and a control parameter includes a vehicle identifier and a vehicle parameter. The notification request message is used to indicate that the vehicle corresponding to the vehicle identifier requests to synchronize the vehicle parameter to the management device. The vehicle identifier is used to mark the vehicle that sends the notification request message. For the vehicle parameter, refer to the vehicle parameter in the embodiment shown in FIG. 7. For brevity, details are not described herein again.

Step 802: The management center sends a first notification response message to the vehicle.

After receiving the notification request message sent by the vehicle, the management center may feedback a notification status of the vehicle parameter to the vehicle.

When vehicle parameter notification succeeds, the management center sends the first notification response message to the vehicle. A message type of the first notification response message is a response, a control command is notification, and a control parameter is a success identifier. The first notification response message is used to notify the vehicle that the management center succeeds in receiving the vehicle parameter.

When vehicle parameter notification fails, step 802 is replaced with the following step 803.

Step 803: The management center sends a second notification response message to the vehicle.

A message type of the second notification response message is a response, a control command is notification, and a control parameter is a failure identifier. The second notification response message is used to notify the vehicle that the management center fails to receive the vehicle parameter, and the vehicle may take a further remedy measure, for example, re-send the notification request message.

It should be noted that, the foregoing technical solution is only an implementation in this embodiment of this application, and should not be construed as a limitation to the protection scope of this application. For example, after receiving the notification request message, the management center may not send the notification response message to the vehicle. In this case, an application objective of this application can still be achieved, and the only difference is that a request/response exchange mechanism can improve message reliability.

According to the method provided in this embodiment of this application, the vehicle can actively send the notification message to the management center, to synchronize the vehicle information of the vehicle to the management center such that the management center updates, in time, the vehicle information stored on the management center.

Figure 9:
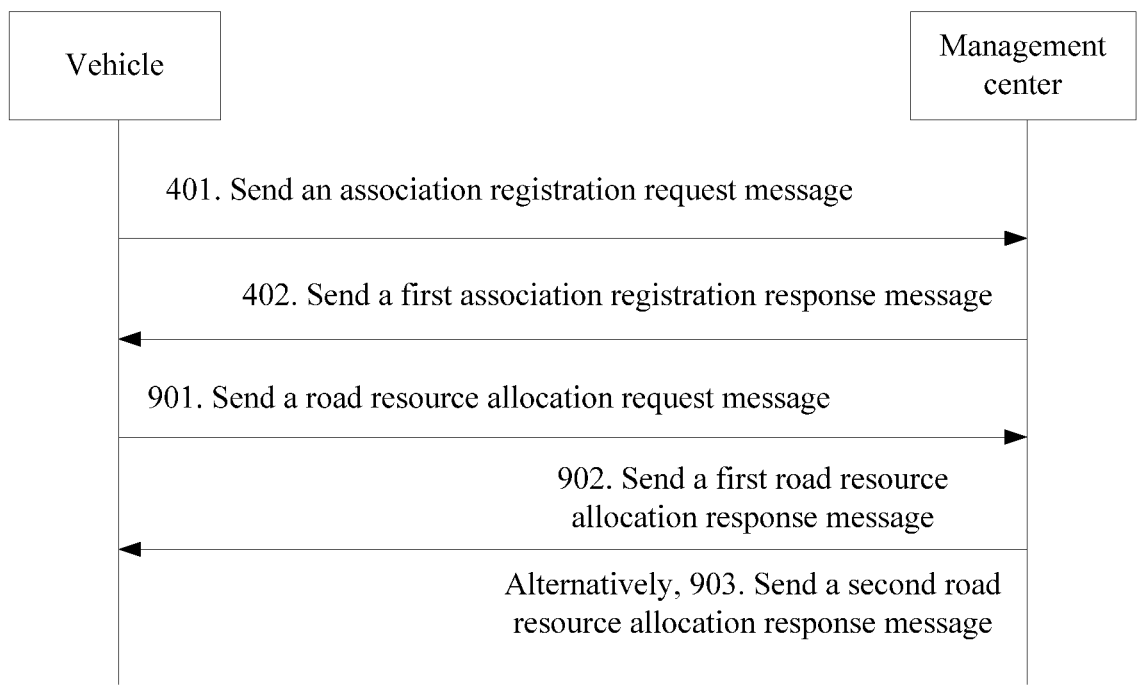
FIG. 9 is a schematic flowchart of another vehicle external communication method according to an embodiment of this application.

Referring to FIG. 9, FIG. 9 is a schematic flowchart of another vehicle external communication method according to an embodiment of this application. As shown in FIG. 9, after receiving a first association registration response message sent by a management center, a vehicle establishes a control association with the management center according to the first association registration response message. In this embodiment of this application, the control association includes one of the following. The vehicle sends an application request message to the management center and receives an application response message that is sent by the management center according to the application request message. The control association includes the following steps.

Step 901: The vehicle sends a road resource allocation request message to the management center.

In an optional embodiment of this application, the vehicle may apply to the management center for a road resource allocation service, such as a travelling path planning service or a road resource scheduling service. Correspondingly, the road resource allocation request message may be a travelling path planning request message, a road resource scheduling request message, or the like.

A message type of the road resource allocation request message is a request, a control command is application, and a control parameter includes a vehicle identifier and road constraint information. The road resource allocation request message is used to indicate that the vehicle requests the management device to allocate a road resource to the vehicle according to the road constraint information. The vehicle identifier is used to mark the vehicle that applies for the road resource allocation service, and the road constraint information is a constraint condition used when the management center selects a road.

Figure 10A:
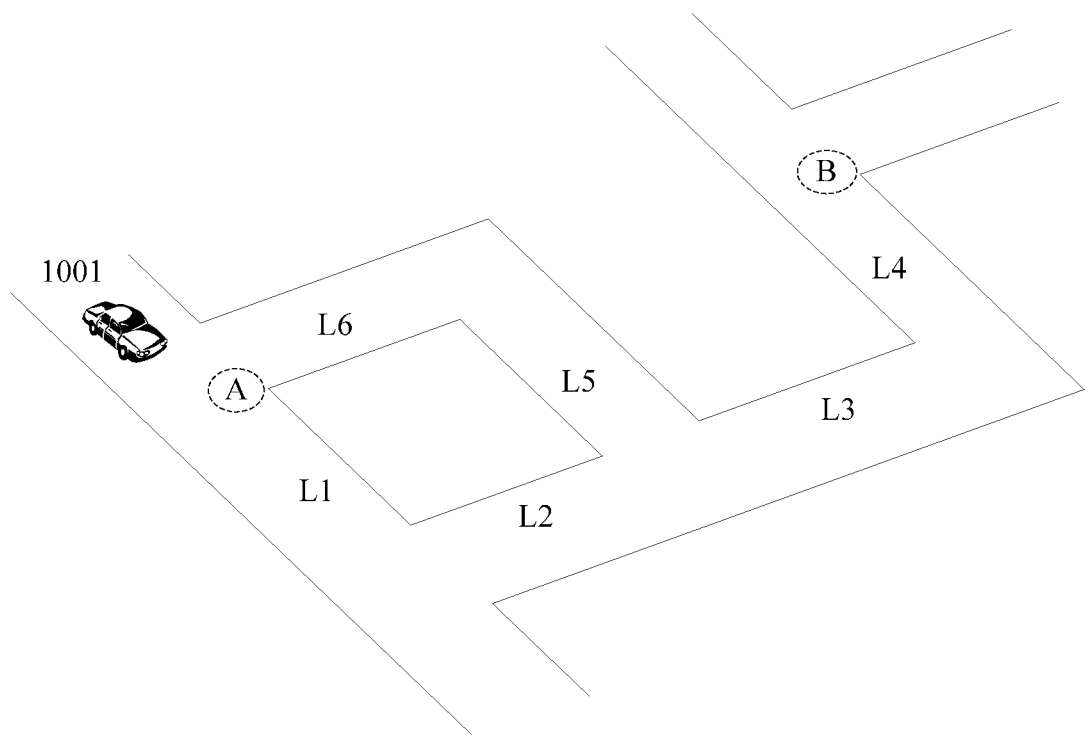
FIG. 10A, FIG. 10B, and FIG. 10C are schematic scenario diagrams of another ITS according to an embodiment of this application.

For example, FIG. 10A shows a vehicle 1001 and roads L1 to L6. When planning to travel from a start point A to a destination B, the vehicle 1001 may send a travelling path planning request message to the management center. Road constraint information of the travelling path planning request message includes coordinates of the start point A and coordinates of the destination B.

Step 902: The management center sends a first road resource allocation response message to the vehicle.

After receiving the road resource allocation request message, the management center may determine, according to the vehicle identifier in the road resource allocation request message, the vehicle that requests road resource allocation, select a road satisfying a requirement of the road constraint information from current road resources, generate road resource allocation information, and send the road resource allocation information to the vehicle such that the vehicle obtains information about the road allocated by the management center to the vehicle.

A message type of the first road resource allocation response message is a response, a control command is application, and a control parameter includes a success identifier and the road resource allocation information. The success identifier is used to indicate that the management center succeeds in allocating the road resource to the vehicle. The road resource allocation information includes the information about the road allocated by the management center to the vehicle, for example, a road code or one or a combination of a time coordinate sequence and a spatial coordinate sequence of planned waypoints.

After receiving the first road resource allocation response message, the vehicle may travel according to road information in the road resource allocation information, and save track recording information at the same time. The track recording information is used to record an actual travelling route of the vehicle, and includes one or a combination of a time coordinate sequence and a spatial coordinate sequence of actual waypoints, to notify the management center or to be queried by the management center.

For example, after receiving a travelling path planning request message sent by vehicle 1001 shown in FIG. 10A, the management center plans a travelling path for the vehicle 1001 in the roads L1 to L6. The management center allocates roads L6, L5, L3, and L4 to the vehicle according to the coordinates of the start point A and the coordinates of the destination B, as shown in a shaded part in FIG. 10B. Further, the management center sends a first road resource allocation response message to the vehicle 1001. A control parameter of the first road resource allocation response message includes the roads L6, L5, L3, and L4 such that the vehicle travels from the start point A to the destination B along L6-L5-L3-L4.

In addition, when there is no road resource satisfying the road constraint information or a road resource for which the vehicle applies conflicts with that of another vehicle, the management center may fail to allocate a road resource to the vehicle. In this case, step 902 is replaced with the following step 903.

Step 903: The management center sends a second road resource allocation response message to the vehicle.

A message type of the second road resource allocation response message is a response, a control command is application, and a control parameter includes a failure identifier, and may further include a description of a cause why road resource allocation fails. The second road resource allocation response message is used to indicate that the management device fails to allocate the road resource to the vehicle.

According to the method provided in this embodiment of this application, the management center can properly allocate the road resource to the vehicle based on a vehicle requirement to improve road resource utilization in a transportation system, and improve passing efficiency of the vehicle.

In an optional embodiment of this application, after receiving the first road resource allocation response message sent by the management center, the vehicle may no longer need to travel on the road allocated by the management center to the vehicle. In this case, the vehicle may request the management center to release the road allocated by the management center to the vehicle to avoid road resource waste.

Because the management center can immediately release a road that has been used by the vehicle, the vehicle needs to request the management center to release only a road that is not used by the vehicle. Further, the vehicle sends a road resource release message to the management center. A control command of the road resource release message is release, and a control parameter includes the vehicle identifier and the track recording information such that the management center releases, according to the track recording information, the road that is not used in the road resource allocation information. The track recording information may include a parameter of the road that has been used by the vehicle.

Figure 10B:
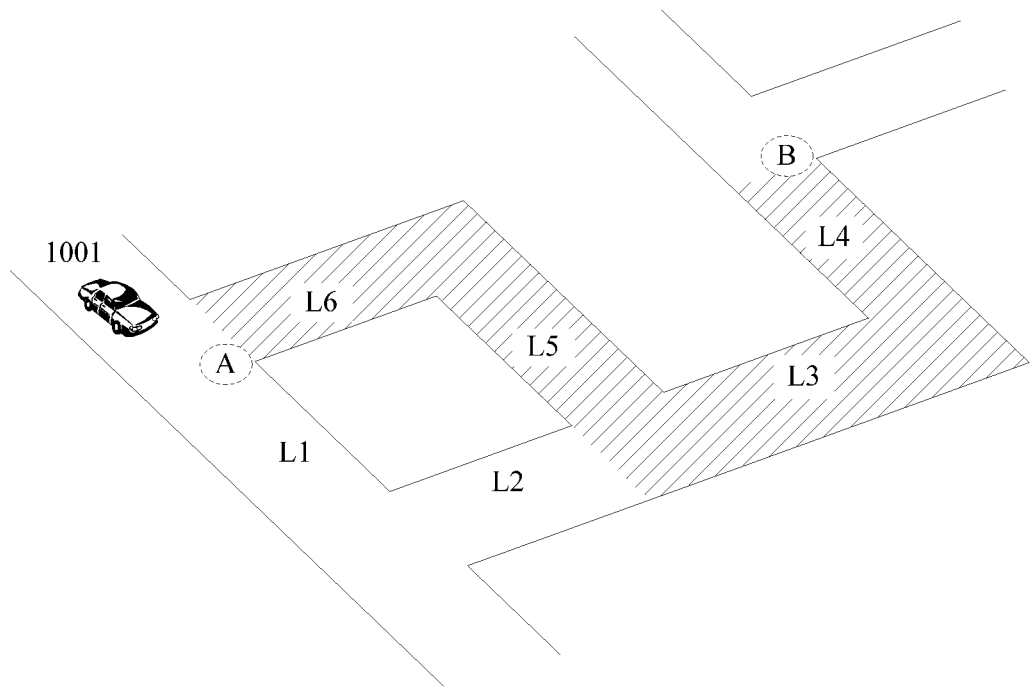
Figure 10C:
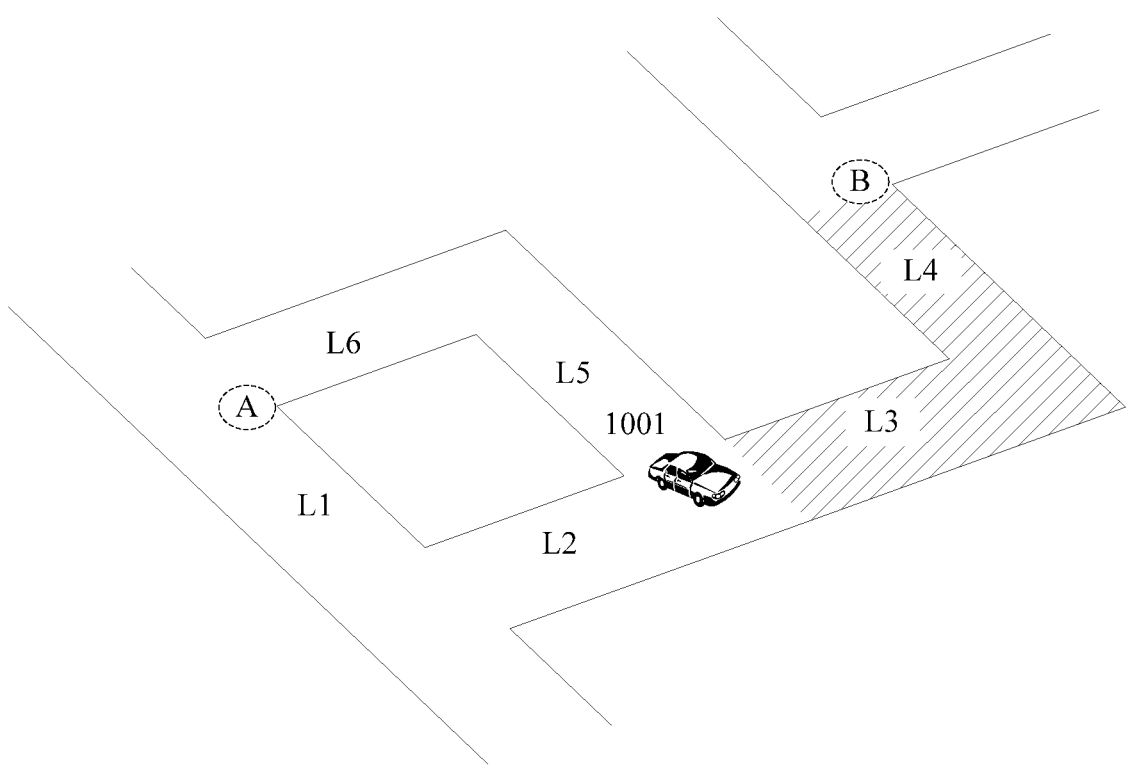

For example, when the vehicle 1001 shown in FIG. 10B travels on the roads L6, L5, L3, and L4 allocated by the management center to the vehicle 1001, the vehicle 1001 needs to change a travelling plan, that is, the vehicle 1001 no longer needs to reach the destination B. To avoid road resource waste, the vehicle 1001 sends a road resource release message to the management center. Assuming that a current location of the vehicle is shown in FIG. 10C, that is, the vehicle 1001 has used the roads L6 and L5, track recording information of the vehicle includes the roads L6 and L5. Therefore, the management center may release, according to the track recording information, the roads L3 and L4 that are not used.

According to the method provided in this embodiment of this application, the vehicle can release, in time, a road resource that the vehicle does not need to improve road resource utilization.

Corresponding to the vehicle external communication method that is provided in the embodiments of this application and that is applied to a vehicle in a transportation system, an embodiment of this application further provides a vehicle external communication apparatus that is applied to the vehicle in the transportation system.

Figure 11:
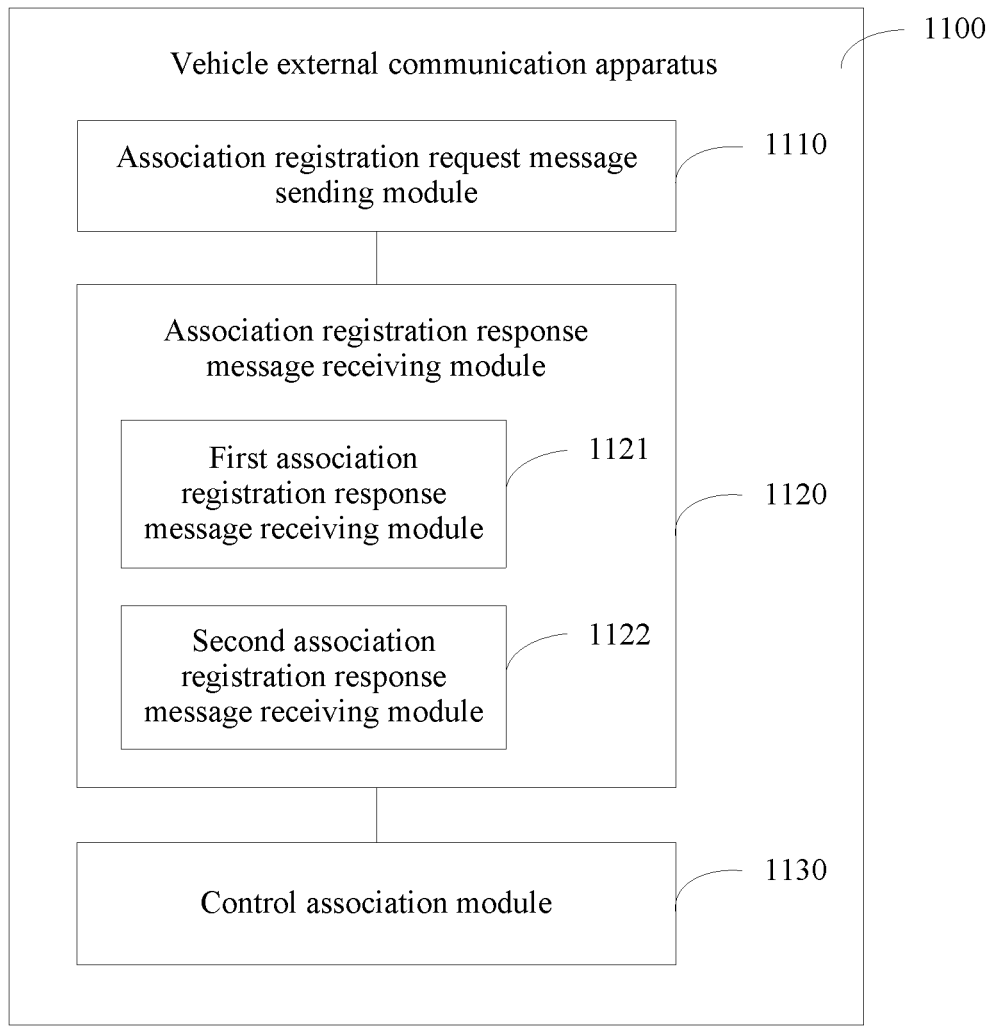
FIG. 11 is a schematic structural diagram of a vehicle external communication apparatus according to an embodiment of this application.

Referring to FIG. 11, FIG. 11 is a schematic structural diagram of a vehicle external communication apparatus 1100 according to an embodiment of this application. The vehicle external communication apparatus 1100 includes an association registration request message sending module 1110, an association registration response message receiving module 1120, and a control association module 1130. The association registration response message receiving module 1120 includes a first association registration response message receiving module 1121 or a second association registration response message receiving module 1122.

The association registration request message sending module 1110 is configured to send an association registration request message to a management device. The association registration request message is used to indicate that the vehicle requests to establish a control association with the management device using the control association module 1130, and the control association includes one of the following, where the vehicle sends an application request message to the management device and receives an application response message that is sent by the management device according to the application request message, the vehicle receives an application request message sent by the management device and sends an application response message to the management device according to the application request message, the vehicle sends a notification message to the management device, or the vehicle receives a notification message sent by the management device.

The first association registration response message receiving module 1121 is configured to receive a first association registration response message that is sent by the management device and that includes a success identifier, and establish control association with the management device according to the first association registration response message. The first association registration response message is used to indicate that the vehicle is allowed to establish control association with the management device.

The second association registration response message receiving module 1122 is configured to receive a second association registration response message that is sent by the management device and that includes a failure identifier. The second association registration response message is used to indicate that the vehicle is forbidden to establish control association with the management device.

In an optional embodiment of this application, the control association module 1130 includes an association deregistration request message sending submodule and an association deregistration response message receiving submodule. The association deregistration response message receiving submodule includes a first association deregistration response message receiving submodule or a second association deregistration response message receiving submodule.

The association deregistration request message sending submodule is configured to send an association deregistration request message to the management device. The association deregistration request message is used to indicate that the vehicle requests to cancel control association with the management device.

The first association deregistration response message receiving submodule is configured to receive a first association deregistration response message that is sent by the management device and that includes a success identifier, and cancel control association with the management device according to the first association deregistration response message. The first association deregistration response message is used to indicate that the vehicle is allowed to cancel control association with the management device.

The second association deregistration response message receiving submodule is configured to receive a second association deregistration response message that is sent by the management device and that includes a failure identifier. The second association deregistration response message is used to indicate that the vehicle is forbidden to cancel control association with the management device.

In an optional embodiment of this application, the control association module 1130 includes a user update request message sending submodule and a user update response message receiving submodule. The user update response message receiving submodule includes a first user update response message receiving submodule or a second user update response message receiving submodule.

The user update request message sending submodule is configured to send a user update request message including a user identifier to the management device. The user update request message is used to indicate that a user corresponding to the user identifier requests to use the vehicle.

The first user update response message receiving submodule is configured to receive a first user update response message that is sent by the management device and that includes a success identifier. The first user update response message is used to indicate that the management device allows the user corresponding to the user identifier to use the vehicle.

The second user update response message receiving submodule is configured to receive a second user update response message that is sent by the management device and that includes a failure identifier. The second user update response message is used to indicate that the management device forbids the user corresponding to the user identifier to use the vehicle.

In an optional embodiment of this application, the control association module 1130 includes a user update message receiving submodule. The user update message receiving submodule is configured to receive a user update message that is sent by the management device and that includes a user identifier. The user update message is used to indicate that a user corresponding to the user identifier is allowed to use the vehicle.

In an optional embodiment of this application, the control association module 1130 includes a query request message receiving submodule and a query response message sending submodule.

The query request message receiving submodule is configured to receive a query request message that is sent by the management device and that includes a vehicle parameter identifier.

The query response message sending submodule is configured to send a query response message to the management device. The query response message includes a vehicle parameter corresponding to the vehicle parameter identifier.

In an optional embodiment of this application, the control association module 1130 includes a notification message sending submodule. The notification message sending submodule is configured to send, to the management device, a notification message including a vehicle parameter corresponding to a vehicle parameter identifier. The notification message is used to instruct to synchronize the vehicle parameter corresponding to the vehicle parameter identifier to the management device.

In an optional embodiment of this application, the notification message sending submodule includes a first vehicle status notification message sending submodule or a second vehicle status notification message sending submodule.

The first vehicle status notification message sending submodule is configured to send a first vehicle status notification message to the management device. The first vehicle status notification message includes a status parameter of a common part of the vehicle.

The second vehicle status notification message sending submodule is configured to send a second vehicle status notification message to the management device. The second vehicle status notification message includes a status parameter of an alarm part or a faulty part of the vehicle.

In an optional embodiment of this application, the notification message sending submodule includes a road resource use notification message sending submodule. The road resource use notification message sending submodule is configured to send a road resource use notification message to the management device. The road resource use notification message includes a parameter of a road that has been used by the vehicle.

In an optional embodiment of this application, the control association module 1130 includes a road resource allocation request message sending submodule and a road resource allocation response message receiving submodule. The road resource allocation response message receiving submodule includes a first road resource allocation response message receiving submodule or a second road resource allocation response message receiving submodule.

The road resource allocation request message sending submodule is configured to send a road resource allocation request message including road constraint information to the management device. The road resource allocation request message is used to indicate that the vehicle requests the management device to allocate a road resource to the vehicle according to the road constraint information.

The first road resource allocation response message receiving submodule is configured to receive a first road resource allocation response message that is sent by the management device and that includes a success identifier and road resource allocation information. The first road resource allocation response message is used to indicate that the management device succeeds in allocating the road resource to the vehicle such that the vehicle obtains the road resource allocation information.

The second road resource allocation response message receiving submodule is configured to receive a second road resource allocation response message that is sent by the management device and that includes a failure identifier. The second road resource allocation response message is used to indicate that the management device fails to allocate the road resource to the vehicle.

In an optional embodiment of this application, the control association module 1130 further includes a road resource release message sending submodule. The road resource release message sending submodule is configured to send a road resource release message to the management device. The road resource release message is used to instruct the management device to release a road that is not used in the road resource allocation information.

In an optional embodiment of this application, the association registration request message sending module includes a management device identity information obtaining submodule and an association registration request message sending submodule.

The management device identity information obtaining submodule is configured to obtain management device identity information.

The association registration request message sending submodule is configured to send the association registration request message to a management device corresponding to the management device identity information.

Corresponding to the vehicle external communication method that is provided in the embodiments of this application and that is applied to a management center in a transportation system, an embodiment of this application further provides another vehicle external communication apparatus that is applied to the management center in the transportation system.

Figure 12:
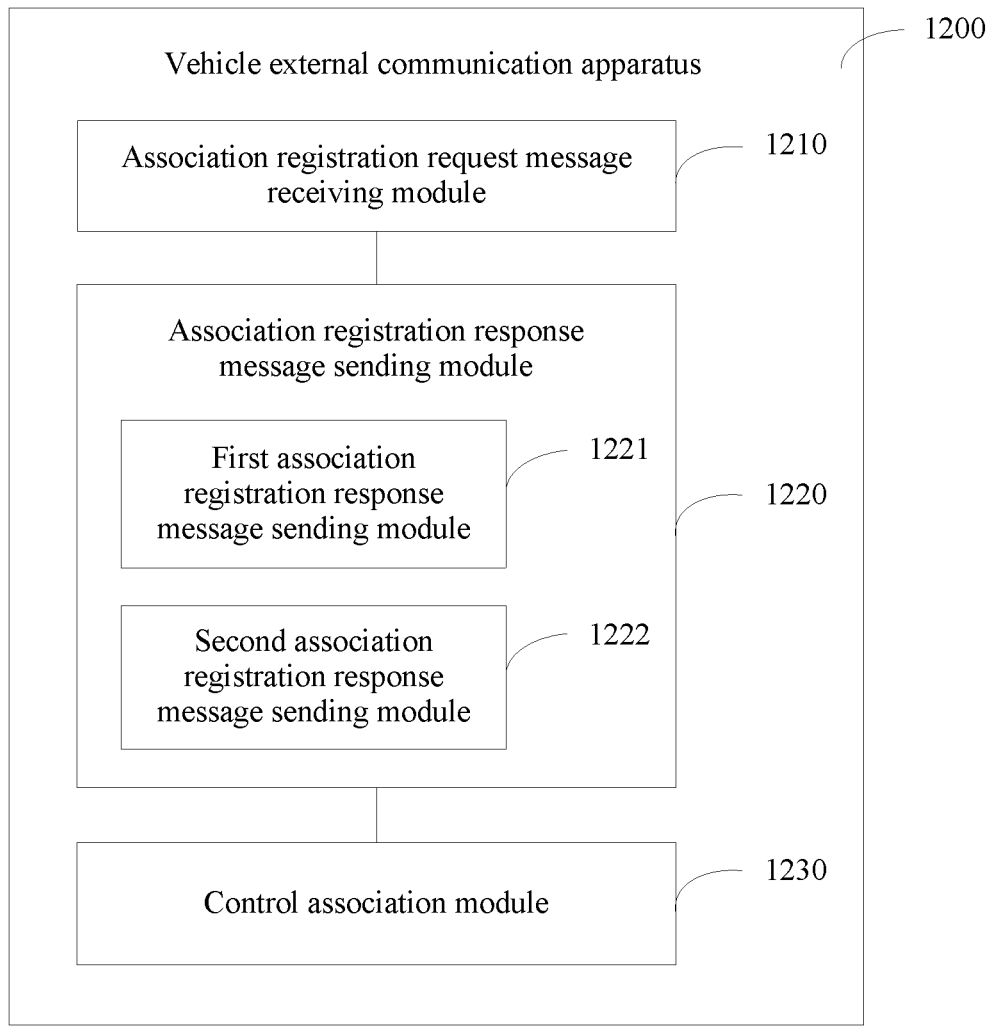
FIG. 12 is a schematic structural diagram of another vehicle external communication apparatus according to an embodiment of this application.

Referring to FIG. 12, FIG. 12 is a schematic structural diagram of another vehicle external communication apparatus 1200 according to an embodiment of this application. The vehicle external communication apparatus 1200 includes an association registration request message receiving module 1210, an association registration response message sending module 1220, and a control association module 1230. The association registration response message sending module 1220 includes a first association registration response message sending module 1221 or a second association registration response message sending module 1222.

The association registration request message receiving module 1210 is configured to receive an association registration request message sent by a vehicle. The association registration request message is used to indicate that the vehicle requests to establish a control association with the management device using the control association module 1230, and the control association includes one of the following. The management device receives an application request message sent by the vehicle and sends an application response message to the vehicle according to the application request message, the management device sends an application request message to the vehicle and receives an application response message that is sent by the vehicle according to the application request message, the management device receives a notification message sent by the vehicle, or the management device sends a notification message to the vehicle.

The first association registration response message sending module is configured to send a first association registration response message including a success identifier to the vehicle such that the vehicle establishes control association with the management device according to the first association registration response message. The first association registration response message is used to indicate that the vehicle is allowed to establish control association with the management device.

The second association registration response message sending module is configured to send a second association registration response message including a failure identifier to the vehicle. The second association registration response message is used to indicate that the vehicle is forbidden to establish control association with the management device.

In an optional embodiment of this application, the control association module 1230 includes an association deregistration request message receiving submodule and an association deregistration response message sending submodule. The association deregistration response message sending submodule includes a first association deregistration response message sending submodule or a second association deregistration response message sending submodule.

The association deregistration request message receiving submodule is configured to receive an association deregistration request message sent by the vehicle. The association deregistration request message is used to indicate that the vehicle requests to cancel control association with the management device.

The first association deregistration response message sending submodule is configured to send a first association deregistration response message including a success identifier to the vehicle such that the vehicle cancels control association with the management device according to the first association deregistration response message. The first association deregistration response message is used to indicate that the vehicle is allowed to cancel control association with the management device.

The second association deregistration response message sending submodule is configured to send a second association deregistration response message including a failure identifier to the vehicle. The second association deregistration response message is used to indicate that the vehicle is forbidden to cancel control association with the management device.

In an optional embodiment of this application, the control association module 1230 includes a user update request message receiving submodule and a user update response message sending submodule. The user update response message sending submodule includes a first user update response message sending submodule or a second user update response message sending submodule.

The user update request message receiving submodule is configured to receive a user update request message that is sent by the vehicle and that includes a user identifier. The user update request message is used to indicate that a user corresponding to the user identifier requests to use the vehicle.

The first user update response message sending submodule is configured to send a first user update response message including a success identifier to the vehicle. The first user update response message is used to indicate that the management device allows the user corresponding to the user identifier to use the vehicle.

The second user update response message sending submodule is configured to send a second user update response message including a failure identifier to the vehicle, where the second user update response message is used to indicate that the management device forbids the user corresponding to the user identifier to use the vehicle.

In an optional embodiment of this application, the control association module 1230 includes a user update message sending submodule. The user update message sending submodule is configured to send a user update message including a user identifier to the vehicle. The user update message is used to indicate that a user corresponding to the user identifier is allowed to use the vehicle.

In an optional embodiment of this application, the control association module includes a query request message sending submodule and a query response message receiving submodule.

The query request message sending submodule is configured to send a query request message to the vehicle.

The query response message receiving submodule is configured to receive a query response message sent by the vehicle. The query response message includes a vehicle parameter corresponding to a vehicle parameter identifier.

In an optional embodiment of this application, the control association module includes a notification message receiving submodule. The notification message receiving submodule is configured to receive a notification message that is sent by the vehicle and that includes a vehicle parameter corresponding to a vehicle parameter identifier. The notification message is used to instruct to synchronize the vehicle parameter corresponding to the vehicle parameter identifier to the management device.

In an optional embodiment of this application, the notification message receiving submodule includes a first vehicle status notification message receiving submodule or a second vehicle status notification message receiving submodule.

The first vehicle status notification message receiving submodule is configured to receive a first vehicle status notification message sent by the vehicle. The first vehicle status notification message includes a status parameter of a common part of the vehicle.

The second vehicle status notification message receiving submodule is configured to receive a second vehicle status notification message sent by the vehicle. The second vehicle status notification message includes a status parameter of an alarm part or a faulty part of the vehicle.

In an optional embodiment of this application, the notification message receiving submodule includes a road resource use notification message receiving submodule. The road resource use notification message receiving submodule is configured to receive a road resource use notification message sent by the vehicle. The road resource use notification message includes a parameter of a road that has been used by the vehicle.

In an optional embodiment of this application, the control association module 1230 includes a road resource allocation request message receiving submodule and a road resource allocation response message sending submodule. The road resource allocation response message sending submodule includes a first road resource allocation response message sending submodule or a second road resource allocation response message sending submodule.

The road resource allocation request message receiving submodule is configured to receive a road resource allocation request message that is sent by the vehicle and that includes road constraint information. The road resource allocation request message is used to indicate that the vehicle requests the management device to allocate a road resource to the vehicle according to the road constraint information.

The first road resource allocation response message sending submodule is configured to send a first road resource allocation response message including a success identifier and road resource allocation information to the vehicle. The first road resource allocation response message is used to indicate that the management device succeeds in allocating the road resource to the vehicle such that the vehicle obtains the road resource allocation information.

The second road resource allocation response message sending submodule is configured to send a second road resource allocation response message including a failure identifier to the vehicle. The second road resource allocation response message is used to indicate that the management device fails to allocate the road resource to the vehicle.

In an optional embodiment of this application, the control association module 1230 further includes a road resource release message receiving submodule. The road resource release message receiving submodule is configured to receive a road resource release message sent by the vehicle. The road resource release message is used to instruct the management device to release a road that is not used in the road resource allocation information.

Corresponding to the vehicle external communication method that is in this application and that is applied to a vehicle, an embodiment of this application further provides a vehicle.

Figure 13:
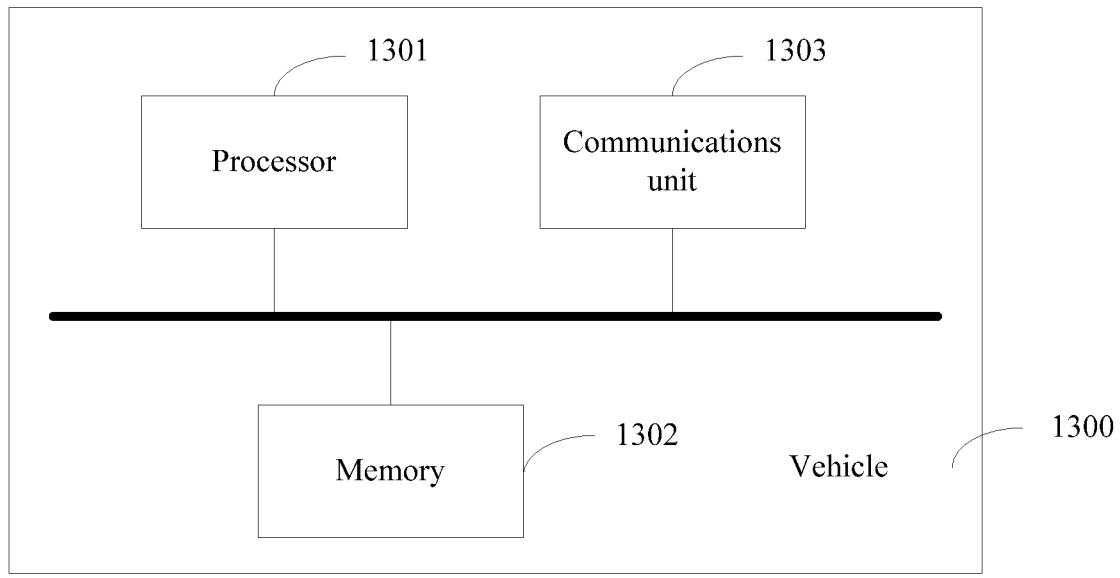
FIG. 13 is a schematic structural diagram of a vehicle according to an embodiment of this application.

Referring to FIG. 13, FIG. 13 is a schematic structural diagram of a vehicle 1300 according to an embodiment of this application. The vehicle 1300 may include a processor 1301, a memory 1302, and a communications unit 1303. These components communicate using one or more buses. A person skilled in the art may understand that a structure of a vehicle shown in the figure does not constitute a limitation on this application. The structure may be a bus structure, or may be a star structure, or may further include more or fewer components than those shown in the figure, or combine some components, or have different component arrangements.

The communications unit 1303 is configured to establish a communications channel such that the vehicle can communicate with another device, and receive user data sent by the other device or send user data to the other device.

The processor 1301 is a control center of the vehicle, connects to various parts of the entire vehicle using various interfaces and lines, and performs various functions of the vehicle and/or data processing by running or executing a software program and/or a module stored in the memory 1302 and invoking data stored in the memory. The processor 1301 may include an Integrated Circuit (IC), for example, may include a single packaged IC, or may include multiple packaged ICs with a same function or different functions. For example, the processor 1301 may include only a Central Processing Unit (CPU). In this implementation of this application, the CPU may be a single computing core, or may include multiple computing cores.

The memory 1302 is configured to store an execution instruction of the processor 1301. The memory 1302 may be implemented by any type of a volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

When the execution instruction in the memory 1302 is executed by the processor 1301, the vehicle 1300 can perform some or all steps of the vehicle external communication method applied to the vehicle.

Figure 14:
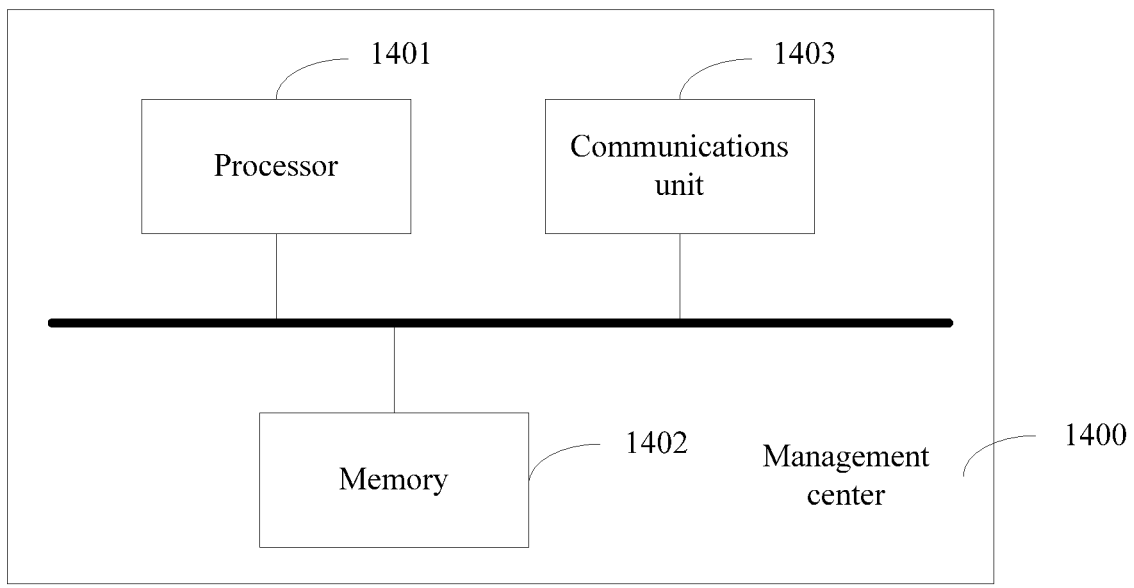
FIG. 14 is a schematic structural diagram of a management center according to an embodiment of this application.

Referring to FIG. 14, FIG. 14 is a schematic structural diagram of a management center 1400 according to an embodiment of this application. The management center 1400 may include a processor 1401, a memory 1402, and a communications unit 1403. These components communicate using one or more buses. A person skilled in the art may understand that a structure of the management center shown in the figure does not constitute a limitation on this application. The structure may be a bus structure, or may be a star structure, or may further include more or fewer components than those shown in the figure, or combine some components, or have different component arrangements.

The communications unit 1403 is configured to establish a communications channel such that the management center can communicate with another device, and receive user data sent by the other device or send user data to the other device.

The processor 1401 is a control center of the management center, connects to various parts of the entire management center using various interfaces and lines, and performs various functions of the management center and/or data processing by running or executing a software program and/or a module stored in the memory 1402 and invoking data stored in the memory. The processor may include an IC, for example, may include a single packaged IC, or may include multiple packaged ICs with a same function or different functions. For example, the processor 1401 may include only a CPU. In this implementation of this application, the CPU may be a single computing core, or may include multiple computing cores.

The memory 1402 is configured to store an instruction of the processor 1401. The memory 1402 may be implemented by any type of a volatile or non-volatile storage device or a combination thereof, for example, an SRAM, an EEPROM, an EPROM, a PROM, a ROM, a magnetic memory, a flash memory, a magnetic disk, or an optical disc.

When the execution instruction in the memory 1402 is executed by the processor 1401, the management center 1400 can perform some or all steps of the vehicle external communication method applied to the management center.

In specific implementation, an embodiment of the present application further provides a computer storage medium, where the computer storage medium may store a program, and when the program is executed, some or all steps of the embodiments of the vehicle external communication method provided in the present application may be performed. The foregoing storage medium may include a magnetic disk, an optical disc, a ROM, or a random access memory (RAM).

A person skilled in the art may clearly understand that, the technologies in the embodiments of the present application may be implemented by software in addition to a general hardware platform. Based on such an understanding, the technical solutions in the embodiments of the present application essentially or the part contributing to other approaches may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present application.

For same or similar parts in the embodiments in this specification, refer to these embodiments. Especially, apparatus and terminal embodiments are basically similar to a method embodiment, and therefore are described briefly. For related parts, refer to partial descriptions in the method embodiment.

The foregoing implementations of the present application do not limit the protection scope of the present application.

What is claimed is:

1. A vehicle external communication method, the vehicle external communication method being applied to a vehicle in a transportation system, and the vehicle external communication method comprising:
sending, by the vehicle, an association registration request message to a management device, the association registration request message indicating that the vehicle requests to establish a control association with the management device, and the control association comprising one of the following four options:
sending, by the vehicle, an application request message to the management device and receiving, by the vehicle, an application response message from the management device according to the application request message;
receiving, by the vehicle, the application request message from the management device and sending, by the vehicle, the application response message to the management device according to the application request message;
sending, by the vehicle, a notification message to the management device; or
receiving, by the vehicle, the notification message from the management device; and
the vehicle external communication method further comprising either:
receiving, by the vehicle, a first association registration response message comprising a success identifier from the management device, and establishing, by the vehicle, the control association with the management device according to the first association registration response message, the first association registration response message indicating that the vehicle is allowed to establish the control association with the management device; or
receiving, by the vehicle, a second association registration response message comprising a failure identifier from the management device, the second association registration response message indicating that the vehicle is forbidden to establish the control association with the management device.

2. The vehicle external communication method of claim 1, wherein sending the application request message to the management device and receiving the application response message from the management device comprises:
sending, by the vehicle, an association deregistration request message to the management device, the association deregistration request message indicating that the vehicle requests to cancel the control association with the management device; and the vehicle external communication method further comprising either:

receiving, by the vehicle, a first association deregistration response message comprising the success identifier from the management device, and cancelling the control association with the management device according to the first association deregistration response message, the first association deregistration response message indicating that the vehicle is allowed to cancel the control association with the management device; or receiving, by the vehicle, a second association deregistration response message comprising the failure identifier from the management device, the second association deregistration response message indicating that the vehicle is forbidden to cancel the control association with the management device.

3. The vehicle external communication method of claim 1, wherein sending the application request message to the management device and receiving the application response message from the management device comprises:

sending, by the vehicle, a user update request message comprising a user identifier to the management device, the user update request message indicating that a user corresponding to the user identifier requests to use the vehicle; and the vehicle external communication method further comprising either:

receiving, by the vehicle, a first user update response message comprising the success identifier from the management device, the first user update response message indicating that the management device allows the user corresponding to the user identifier to use the vehicle; or receiving, by the vehicle, a second user update response message comprising the failure identifier from the management device, the second user update response message indicating that the management device forbids the user corresponding to the user identifier to use the vehicle.

4. The vehicle external communication method of claim 1, wherein receiving the notification message from the management device comprises receiving, by the vehicle, a user update message comprising a user identifier from the management device, and the user update message indicating that a user corresponding to the user identifier is allowed to use the vehicle.

5. The vehicle external communication method of claim 1, wherein receiving the application request message from the management device and sending the application response message to the management device comprises:

receiving, by the vehicle, a query request message comprising a vehicle parameter identifier from the management device; and sending, by the vehicle, a query response message to the management device, the query response message comprising a vehicle parameter corresponding to the vehicle parameter identifier.

6. The vehicle external communication method of claim 1, wherein sending the notification message to the management device comprises sending, by the vehicle to the management device, the notification message comprising a vehicle parameter corresponding to a vehicle parameter identifier, and the notification message instructing to synchronize the vehicle parameter corresponding to the vehicle parameter identifier to the management device.

7. The vehicle external communication method of claim 6, wherein sending the notification message comprising the vehicle parameter corresponding to the vehicle parameter identifier comprises either:

sending, by the vehicle, a first vehicle status notification message to the management device, the first vehicle status notification message comprising a status parameter of a common part of the vehicle; or sending, by the vehicle, a second vehicle status notification message to the management device, the second vehicle status notification message comprising a status parameter of an alarm part or a faulty part of the vehicle.

8. The vehicle external communication method of claim 6, wherein sending the notification message comprising the vehicle parameter corresponding to the vehicle parameter identifier comprises sending, by the vehicle, a road resource use notification message to the management device, and the road resource use notification message comprising a parameter of a road having been used by the vehicle.

9. The vehicle external communication method of claim 5, wherein the vehicle parameter identifier comprises at least one of a vehicle item identifier or a vehicle subitem identifier, and a vehicle parameter corresponding to the vehicle item identifier comprising a vehicle parameter corresponding to the vehicle subitem identifier.

10. The vehicle external communication method of claim 1, wherein sending the application request message to the management device and receiving the application response message from the management device comprises:

sending, by the vehicle, a road resource allocation request message comprising road constraint information to the management device, the road resource allocation request message indicating that the vehicle requests the management device to allocate a road resource to the vehicle according to the road constraint information; and the vehicle external communication method further comprising either:

receiving, by the vehicle, a first road resource allocation response message comprising the success identifier and road resource allocation information from the management device, the first road resource allocation response message indicating that the management device succeeds in allocating the road resource to the vehicle to enable the vehicle to obtain the road resource allocation information; or receiving, by the vehicle, a second road resource allocation response message comprising the failure identifier from the management device, the second road resource allocation response message indicating that the management device fails to allocate the road resource to the vehicle.

11. The vehicle external communication method of claim 10, wherein after obtaining the road resource allocation information, the method further comprises sending, by the vehicle, a road resource release message to the management device, and the road resource release message instructing the management device to release a road not used in the road resource allocation information.

12. The vehicle external communication method of claim 1, wherein sending the association registration request message to the management device comprises:

obtaining, by the vehicle, management device identity information; and sending, by the vehicle, the association registration request message to the management device corresponding to the management device identity information.

13. The vehicle external communication method of claim 1, wherein sending the association registration request message to the management device comprises sending, by the vehicle, the association registration request message comprising vehicle identity information to the management device, and the association registration request message indicating that the vehicle corresponding to the vehicle identity information requests to establish the control association with the management device.

14. A vehicle external communication method, the vehicle external communication method being applied to a management device in a transportation system, and the vehicle external communication method comprising:
receiving, by the management device, an association registration request message from a vehicle, the association registration request message indicating that the vehicle requests to establish a control association with the management device, and the control association comprising one of the following four options:
receiving, by the management device, an application request message from the vehicle and sending, by the management device, an application response message to the vehicle according to the application request message;
sending, by the management device, the application request message to the vehicle and receiving, by the management device, the application response message from the vehicle according to the application request message;
receiving, by the management device, a notification message from the vehicle; or
sending, by the management device, the notification message to the vehicle; and
the vehicle external communication method further comprising either:
sending, by the management device, a first association registration response message comprising a success identifier to the vehicle to enable the vehicle to establish the control association with the management device according to the first association registration response message, the first association registration response message indicating that the vehicle is allowed to establish the control association with the management device; or
sending, by the management device, a second association registration response message comprising a failure identifier to the vehicle, the second association registration response message indicating that the vehicle is forbidden to establish the control association with the management device.

15. The vehicle external communication method of claim 14, wherein receiving the application request message from the vehicle and sending the application response message to the vehicle comprises:
receiving, by the management device, an association deregistration request message from the vehicle, the association deregistration request message indicating that the vehicle requests to cancel the control association with the management device; and
the vehicle external communication method further comprising either:
sending, by the management device, a first association deregistration response message comprising the success identifier to the vehicle to enable the vehicle to cancel the control association with the management device according to the first association deregistration response message, the first association deregistration response message indicating that the vehicle is allowed to cancel the control association with the management device; or
sending, by the management device, a second association deregistration response message comprising the failure identifier to the vehicle, the second association deregistration response message indicating that the vehicle is forbidden to cancel the control association with the management device.

16. The vehicle external communication method of claim 14, wherein receiving the application request message from the vehicle and sending the application response message to the vehicle comprises:
receiving, by the management device, a user update request message comprising a user identifier from the vehicle, the user update request message indicating that a user corresponding to the user identifier requests to use the vehicle; and
the vehicle external communication method further comprising either:
sending, by the management device, a first user update response message comprising the success identifier to the vehicle, the first user update response message indicating that the management device allows the user corresponding to the user identifier to use the vehicle; or
sending, by the management device, a second user update response message comprising the failure identifier to the vehicle, the second user update response message indicating that the management device forbids the user corresponding to the user identifier to use the vehicle.

17. The vehicle external communication method of claim 14, wherein sending the notification message to the vehicle comprises sending, by the management device, a user update message comprising a user identifier to the vehicle, and the user update message indicating that a user corresponding to the user identifier is allowed to use the vehicle.

18. The vehicle external communication method of claim 14, wherein sending the application request message to the vehicle and receiving the application response message from the vehicle comprises:
sending, by the management device, a query request message to the vehicle; and
receiving, by the management device, a query response message from the vehicle, the query response message comprising a vehicle parameter corresponding to a vehicle parameter identifier.

19. The vehicle external communication method of claim 14, wherein receiving the notification message from the vehicle comprises receiving, by the management device, the notification message comprising a vehicle parameter corresponding to a vehicle parameter identifier from the vehicle, and the notification message instructing to synchronize the vehicle parameter corresponding to the vehicle parameter identifier to the management device.

20. A vehicle external communication apparatus, the vehicle external communication apparatus being applied to a vehicle in a transportation system, and the vehicle external communication apparatus comprising:
a memory comprising instructions; and
a processor coupled to the memory, the instructions causing the processor to be configured to:

send an association registration request message to a management device, the association registration request message indicating that the vehicle requests to establish a control association with the management device, and the control association comprising one of the following four options:
    send an application request message to the management device and receive an application response message from the management device according to the application request message;
    receive the application request message from the management device and send the application response message to the management device according to the application request message;
    send a notification message to the management device; or
    receive the notification message from the management device; and the instructions further causing the processor to be configured to either:
    receive a first association registration response message comprising a success identifier from the management device, and establish control association with the management device according to the first association registration response message, the first association registration response message indicating that the vehicle is allowed to establish the control association with the management device; or
    receive a second association registration response message comprising a failure identifier from the management device, the second association registration response message indicating that the vehicle is forbidden to establish the control association with the management device.

* * * * *